United States Patent
Doland et al.

(10) Patent No.: US 8,123,123 B1
(45) Date of Patent: Feb. 28, 2012

(54) AUTOMATED BANKING MACHINE THAT OPERATES RESPONSIVE TO DATA BEARING RECORDS

(75) Inventors: Anne E. Doland, Uniontown, OH (US); Joseph A. McGinley, North Canton, OH (US); Robert J. Konecny, Brunswick, OH (US); Charles E. Crallie, Akron, OH (US); Judith Edwards, Canton, OH (US); Tim Crews, Alliance, OH (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 12/802,496

(22) Filed: Jun. 8, 2010

Related U.S. Application Data

(63) Continuation of application No. 11/421,120, filed on May 31, 2006, which is a continuation-in-part of application No. 10/746,276, filed on Dec. 26, 2003, now abandoned, said application No. 11/421,120.

(60) Provisional application No. 60/436,883, filed on Dec. 26, 2002, provisional application No. 60/436,784, filed on Dec. 26, 2002, provisional application No. 60/436,780, filed on Dec. 26, 2002, provisional application No. 60/436,882, filed on Dec. 26, 2002, provisional application No. 60/436,779, filed on Dec. 26, 2002, provisional application No. 60/436,719, filed on Dec. 26, 2002, provisional application No. 60/436,908, filed on Dec. 26, 2002, provisional application No. 60/436,832, filed on Dec. 26, 2002, provisional application No. 60/436,831, filed on Dec. 26, 2002, provisional application No. 60/487,754, filed on Jul. 15, 2003, provisional application No. 60/687,132, filed on Jun. 3, 2005, provisional application No. 60/687,176, filed on Jun. 3, 2005, provisional application No. 60/687,175, filed on Jun. 3, 2005, provisional application No. 60/687,268, filed on Jun. 3, 2005, provisional application No. 60/687,263, filed on Jun. 3, 2005, provisional application No. 60/687,131, filed on Jun. 3, 2005, provisional application No. 60/687,571, filed on Jun. 3, 2005.

(51) Int. Cl.
*G07F 19/00* (2006.01)
*G06Q 20/00* (2006.01)

(52) U.S. Cl. ....................................... 235/379; 705/64

(58) Field of Classification Search .................. 235/379; 705/50–79
See application file for complete search history.

(56) References Cited

U.S. PATENT DOCUMENTS

| | | | | |
|---|---|---|---|---|
| 4,317,957 | A * | 3/1982 | Sendrow | 705/71 |
| 4,500,750 | A * | 2/1985 | Elander et al. | 705/72 |
| 5,228,084 | A * | 7/1993 | Johnson et al. | 705/71 |
| 5,721,781 | A | 2/1998 | Deo et al. | |
| 5,878,141 | A | 3/1999 | Daly et al. | |
| 6,308,887 | B1 | 10/2001 | Korman et al. | |
| 6,676,018 | B1 | 1/2004 | Trelawney et al. | |

(Continued)

*Primary Examiner* — Jamara Franklin
(74) *Attorney, Agent, or Firm* — Christopher L. Parmelee; Ralph E. Jocke; Walker & Jocke

(57) ABSTRACT

An automated banking machine operates responsive to data read from data bearing records to cause financial transfers. The machine includes a card reader that operates to read card data from user cards. The card data corresponds to financial accounts. The automated banking machine includes a cash dispenser and the machine carries out transaction functions for consumers including dispensing cash. The automated banking machine is operative to use an encrypting pin pad to produce screen data usable to generate a visual output on a display screen.

17 Claims, 11 Drawing Sheets

U.S. PATENT DOCUMENTS

| | | |
|---|---|---|
| 6,854,642 B2 | 2/2005 | Metcalf et al. |
| 7,298,850 B2 | 11/2007 | Whytock |
| 7,419,090 B2 | 9/2008 | Sawa |
| 2001/0037301 A1 | 11/2001 | Shepley et al. |
| 2002/0026575 A1 | 2/2002 | Wheeler et al. |
| 2002/0123972 A1 | 9/2002 | Hodgson et al. |
| 2007/0040023 A1 | 2/2007 | Ruggierello et al. |

* cited by examiner

| 200 | | 204 |
|---|---|---|
| \multicolumn{3}{c}{Flash Drive Authentication} | | |
| Flash Drive | | Login App |
| * Service person inserts Flash Drive into USB<br>* Service person enters personal PIN<br>* Sends credential to Login APP | $S_{CA}(Ident, SHA1\,(PIN))$ <br> 202 →  | |
| | | * Verifies the signature on credential using the root CA certificate, $Cert_{CA}$<br>* Calculates hash of PIN and compares to value in credential<br>* If hash verifies then Flash Drive is authenticated<br>* Display menu that includes logging onto Service_ATM account |
| * Service person requests to log onto Service_ATM account<br>* Send encrypted Service_ATM password part #1 | $e_{PIN}(\,e_{TPM}\,(PSWD_{PART1})\,)$ <br> 206 → | |
| | | * Decrypt part #1 of the Service_ATM password with symmetric key generated from PIN. Decrypt again using key stored in all TPMs<br>* Get $PSWD_{PART2}$ from the registry<br>* Combine $PSWD_{PART1}$ and $PSWD_{PART2}$ to create Service_ATM password<br>* SetWinlogon to auto logon to Service_ATM account |

FIG. 9

Crypto Token Authentication

| Crypto Token | | Login App |
|---|---|---|
| * Service person inserts Token into USB<br>* Service Person logs onto Token using personal PIN<br>* Token verifies PIN and provides access to private key functions<br>* Sends Token certificate to Login App | $\xrightarrow{Cert_{TOKEN}}$ 222 | |
| | $\xleftarrow{RAND}$ 226 | * Verifies the signature on $Cert_{TOKEN}$ using the root CA certificate. $Cert_{CA}$<br>* Stores public verification key of Token, $TOKEN_V$<br>* Generates random number and sends to Token |
| *Use Token's private signature key, $TOKEN_S$, to sign random number | $\xrightarrow{S_{TOKEN}(RAND)}$ 228 | |
| | | *Use $TOKEN_V$ to verify signature on random number<br>* If signature verifies then Token is authenticated<br>* Display menu that includes logging onto Service_ATM account |
| * Service person requests to log onto Service_ATM account<br>*Use Private Decipherment key, $TOKEN_D$, to decrypt:<br>* $E_{TOKEN}(PSWD_{PART1})$ to get $PSWD_{PART1}$ | $\xrightarrow{PSWD_{PART1}}$ 230 | |
| | | * Get $PSWD_{PART2}$ from the registry<br>* Combine $PSWD_{PART1}$ and $PSWD_{PART2}$ to create Service_ATM password<br>* Set Winlogon to auto logon to Service_ATM account |

FIG. 10

AUTOMATED BANKING MACHINE THAT OPERATES RESPONSIVE TO DATA BEARING RECORDS

CROSS REFERENCE TO RELATED APPLICATIONS

This application is a continuation of U.S. application Ser. No. 11/421,120 filed May 31, 2006, which is a continuation-in-part of U.S. application Ser. No. 10/746,276 filed Dec. 26, 2003, which claims benefit of U.S. provisional application Ser. Nos. 60/436,883 filed Dec. 26, 2002; 60/436,784 filed Dec. 26, 2002; 60/436,780 filed Dec. 26, 2002; 60/436,882 filed Dec. 26, 2002; 60/436,779 filed Dec. 26, 2002; 60/436,719 filed Dec. 26, 2002; 60/436,908 filed Dec. 26, 2002; 60/436,832 filed Dec. 26, 2002; 60/436,831 filed Dec. 26, 2002 and 60/487,754 filed Jul. 15, 2003. U.S. application Ser. No. 11/421,120 also claims benefit under 35 U.S.C. 119(e) of U.S. provisional application Ser. Nos. 60/687,132 filed Jun. 3, 2005; 60/687,176 filed Jun. 3, 2005; 60/687,175 filed Jun. 3, 2005; 60/687,268 filed Jun. 3, 2005; 60/687,263 filed Jun. 3, 2005; 60/687,131 filed Jun. 3, 2005; and 60/687,571 filed Jun. 3, 2005. All of these applications are hereby incorporated herein by reference.

TECHNICAL FIELD

This invention relates to automated banking machines that are operated responsive to data read from bearing records such as user cards to cause financial transfers, and which may be classified in U.S. class 235, subclass 379.

BACKGROUND ART

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. Automated banking machines may benefit from improvements.

OBJECTS OF EXEMPLARY EMBODIMENTS

It is an object of an exemplary embodiment to provide an automated banking machine at which a user may conduct transactions.

It is a further object of an exemplary embodiment to provide an automated banking machine which is more secure.

It is a further object of an exemplary embodiment to provide an automated banking machine that has increased resistance to being attacked by an unauthorized user.

It is a further object of an exemplary embodiment to provide an automated banking machine which is operative to prevent unauthorized modifications to the ATM from enabling the theft of cash or transaction information.

Further objects of exemplary embodiments will be made apparent in the following Detailed Description of Exemplary Embodiments and the appended claims.

The foregoing objects may be accomplished in an embodiment of an automated banking machine. A common type of automated banking machine used by consumers is an automated teller machine. Automated teller machines enable customers to carry out banking transactions. Common banking transactions that may be carried out with automated teller machines include the dispensing of cash, the making of deposits, the transfer of funds between accounts, the payment of bills and account balance inquiries. The types of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or traveler's checks. For purposes of this disclosure an automated teller machine, an automated banking machine, or an automated transaction machine shall encompass any device which carries out transactions including transfers of value.

Automated teller machine cases may have a plurality of designs and shapes. For example, automated teller machines may include a large reinforced security chest or safe which is capable of enclosing both a cash dispenser mechanism and a computer which operates the cash dispenser as well as the other devices of the automated teller machine. In other automated teller machines, the computer of the automated teller machine may be located outside the chest, although still within a locked enclosure or fascia. Unfortunately, an enclosure or fascia may be less secure than a chest and may be pried or cracked open. As a result, computers or other automated teller machine devices located outside the chest may have an increased risk of being modified or hacked by unauthorized users. Such modifications may compromise the security of the automated teller machine and improperly cause the automated teller machine to dispense cash or otherwise transfer value to the unauthorized user.

In addition, automated teller machines are connected to at least one network. Such networks may include private networks which include one or more automated teller machine host banking systems. Such networks may also include public networks such as the Internet. Automated teller machines may also use standard Internet protocols to communicate with automated teller machine host banking systems. Such standard protocols may include network protocols such as TCP/IP. As a result, automated teller machines which use TCP/IP may be attacked with the same types of hacking tools used to attack web sites, and other types of computer systems on the Internet.

Once an unauthorized user has gained access to the computer and/or other hardware of an automated teller machine, whether by network communication or physical access to the inside of an automated teller machine, the unauthorized user may have the opportunity to steal information from the automated teller machine. For example an unauthorized user may attempt to have unauthorized software (i.e. viruses, worms, sniffer programs) execute on the automated teller machine which is operative to capture transaction information such as account numbers, personal identification numbers, and other secret information. As a result, there further exists a need for an automated banking machine which has increased protection against the theft of transaction information. In addition, such unauthorized software could attempt to cause a cash dispenser to dispense cash improperly or cause other devices to operate in an unauthorized manner. As a result, there further exists a need for an automated banking machine which has increased protection against unauthorized software taking control of the machine.

As discussed herein an automated banking may also be referred to as an automated teller machine ("ATM"), an automated transaction machine or a self service terminal. The automated banking machine may include output devices such as a display screen and receipt printer. The automated banking machine may further include input devices such as a touch screen, keyboard, keypad, function keys, and a card reader. The automated banking machine may further include transaction function devices such as a cash dispenser mechanism for sheets of currency, a depository mechanism, currency recycler, and other transaction function devices which are used by the machine in carrying out banking transactions including transfers of value.

In this described embodiment the automated banking machine may include at least one computer. The computer may be in operative connection with the output devices and the input devices, as well as with the cash dispenser mechanism, depository mechanism and other physical transaction function devices in the banking machine. The computer may further be operative to communicate with a host system located remotely from the machine.

In embodiments of the automated banking machine, the computer may include software components that are executable therein. The software components of the automated banking machine may be operative to cause the computer to output user interface screens through a display device of the machine. The user interface screens may include consumer screens which provide a consumer with information for performing consumer operations such as banking functions with the machine. The user interface screens may further include service screens which provide an authorized user servicing the machine with information for performing service and maintenance operations with the machine. In addition, the machine may include software components operative in the computer for controlling and communicating with hardware devices of the machine including the input devices, output devices and the transaction function devices.

In an embodiment the automated banking machine includes a plurality of components which may correspond to two or more of the previously described input devices, output devices, transaction function devices, and/or software components. The plurality of components may include a first component and a second component. The first and second components are operative to securely communicate with each other. Such secure communications may include passing encrypted information between each other which is associated with a transaction function being performed by the machine. Such a transaction function may correspond to the dispense of cash or any other function performed by the automated banking machine. The information may be encrypted and decrypted with a secret key such as a DES, AES or other symmetrical key known to both the first and second components. The information may also be encrypted and decrypted with an asymmetric public/private key pair such as RSA. The encrypted information may correspond to account numbers, personal identification numbers (PINs), status information, error information, encryption keys, software function or event calls, operational commands, or any other type of information associated with the operation of the machine which may be passed between hardware and/or software components of an automated banking machine for purposes of performing a transaction function.

When the secure communication between the first and second components is being established, the second component of the embodiment may be operative to authenticate the identity of the first component in order to prevent the possibility of a "man in the middle" hacking attack. Such a "man in the middle" hacking attack may correspond to a software virus, worm, or an imposter hardware device or software component which is constructed to intercept secure communications between components. In one scenario of a "man in the middle" attack, the rogue software or hardware component may function as a router which filters the intended communications between the first and second components. Such filtering may enable the rogue component to acquire the secret key or keys used to decrypt the information being communicated between the first and second components. Such filtering may also enable a rogue component to replay sampled communications to cause a hardware device or other component to repeat a function.

The embodiment of the present invention may be operative to prevent a "man in the middle" attack by requiring the first component to authenticate itself to the second component. Examples of methods and systems usable by components to authenticate each other in an ATM are shown in U.S. application Ser. No. 10/746,276 filed Dec. 26, 2003 which is hereby incorporated by reference herein. U.S. application Ser. No. 10/746,276 discloses examples for establishing secure communications between components in which the computer of an ATM may or may not include a trusted platform module (TPM). In an embodiment in which the computer includes a TPM, the ATM may be operative to establish a trusted platform (TP) using the TPM and associated software which complies with a trusted computing platform or base specification. The trusted platform may be used to perform all or portions of the cryptographic functions for the software and hardware components of the ATM to establish secure communications between the components. In addition, the computer of the ATM may use the TPM to establish secure communications with a remote computer such as a host banking system. Further, the TPM may be used to enable an ATM component such as a cash dispenser to verify that the software components controlling the cash dispenser are authorized to do so. In addition, the TPM may be used to generate account passwords usable by the ATM to log into an operating system login account for purposes of configuring and servicing the machine.

For example, an embodiment of an ATM may be operative to carrying out a method which comprises through operation of at least one computer in the ATM, using a TPM in the ATM to establish encrypted communication with a transaction function device in the ATM. In this described embodiment, the ATM may include a cash dispenser. Once the encrypted communication is established, the method may further comprise the at least one computer and at least one processor in the transaction function device, sending encrypted operational data between the computer and the transaction function device which is operative to enable the ATM to perform a function.

In this described embodiment, the step of establishing the encrypted communication may comprise the at least one computer, using the TPM to encrypt at least one key such as a session key to form encrypted key data. The method step of establishing the encrypted communication may further comprise the at least one computer, causing the encrypted key data to be communicated from the at least one computer to the at least one transaction function device. In addition, the method step of establishing the encrypted communication may comprise the at least one processor in the at least one transaction function device, decrypting the at least one key from the encrypted key data.

The at least one computer and the at least one processor in the at least one transaction function device are operative to use the key to encrypt and decrypt the operational data sent therebetween. The key may correspond to a symmetrical key usable with cryptographic algorithms such as DES, triple DES, AES, or any other encryption/decryption operation capable of being performed by the computer using the TPM and the processor in the transaction function device. The at least one computer may use the TPM to securely store the key in either the TPM or an encrypted file or other location external to the TPM. The at least one processor of the transaction function device may also store the key in a data store of the transaction function device.

In this described embodiment, the step of communicating the encrypted operational data may comprise at least one of the TPM and the at least one computer encrypting the operational data using the at least one key and sending the encrypted operational data to the transaction function device. In addition, the communicating step may comprise the at least one processor in the at least one transaction function device decrypting the operational data using the at least one key. Once the operational data is decrypted, the at least one processor may enable the at least one transaction function device to operate responsive to the operational data.

When the transaction function device corresponds to a cash dispenser, the cash dispenser may be adapted to dispense cash responsive to the operational data. The operational data may specify an amount of cash to dispense and other parameters usable by the cash dispenser to operate such as the numbers and denominations of bills to dispense. In addition, the operational data may correspond to commands to perform diagnostic operations and/or commands to return status information. In this described embodiment, the operational data communicated to the transaction function device in the ATM may correspond to any commands, parameters, configuration data, or any other communication the device is adapted to receive for use with carrying out operations in the ATM.

In the described embodiment, the method may further comprise the least one processor in the at least one transaction function device, causing the at least one transaction function device to operate. The operational data communicated in the method may be associated with the operation of the at least one transaction function device. The communication step may then include the at least one processor in the at least one transaction function device encrypting the operational data using the at least one key and sending the encrypted operational data to at least one computer. The communication step may then include at least one of the TPM and the at least one computer, decrypting the operational data using the at least one key. Once the operational data has been decrypted, the method may include the at least one computer, causing the ATM to perform at least a portion of a transaction function responsive to the operational data.

In this described embodiment, the operational data sent from the transaction function device may include status information, inputs, error messages, diagnostic information, commands, messages, or any other data that the transaction function device may be capable of communicating to the computer in the ATM. For example, if the transaction function device corresponds to a cash dispenser, the operational data may be representative of whether cash was successfully dispensed by the cash dispenser. Also, for example, if the transaction function device corresponds to an encrypting pin pad (EPP), the operational data sent from the EPP may include inputs representative of an amount of cash to withdraw, a PIN, menu selections, or any other information capable of being received through operation of the keypad of the EPP.

In the described embodiment of the method, the at least one computer in the ATM may be responsive to the operational data received to continue carrying out a transaction. Such a transaction may require communications with a host banking system; thus the method may include the at least one computer sending a message to a host banking system responsive to the operational data. Such a message may include the operational data. If an authorization is needed to complete the transaction function, the host banking system may then communicate an authorization message to the ATM and the at least one computer responsive to the authorization may carry out the requested transaction function such as dispensing cash, for example.

In this described embodiment of the method, the transaction function device may comprise a cash dispenser, a depositor, a card reader, and an EPP. However, it is to be understood that in alternative embodiments the method may be carried out with other types of devices in an ATM including input devices, output devices, or any other device in which it may be desirable to encrypt information passed to or from the device. Also in this described embodiment, the step of establishing encrypted communication may include a key transport mechanism carried out between the at least one transaction function device and the at least one computer of the ATM which corresponds to Key Transport Mechanism 5 of ISO IEC 11770-3. However, in alternative embodiments other key transfer protocols may be used.

In the above-described method of establishing encrypted communications between the computer in the ATM and a transaction function device in the ATM, the TPM is used to carry out portions of the method steps. For example, the TPM may be used to perform portions of the cryptographic encryption and decryption operations. The TPM may also be used to securely store the sessions keys, private keys and/or any other information usable to carry out the method steps. The TPM may also be used to digitally sign data and/or authenticate signed data.

A TPM may also be used to establish encrypted communication between the ATM and a remote server such as a host banking system. For example, an embodiment of such a method may include the at least one computer in an ATM storing a digital certificate in the ATM, which digital certificate comprises a public key. The method may further include the at least one computer in the ATM using the TPM to store a private key associated with the public key in the ATM. The method may include the at least one computer in the ATM, establishing a secure communication session between the ATM and a remote server through use of the digital certificate and the private key.

If the remote server corresponds to a host banking system, the method may further comprise the at least one computer in the ATM using the secure communication session to receive an authorization to dispense cash through operation of a cash dispenser in the ATM and responsive to the authorization, dispensing cash through operation of the cash dispenser.

In this described embodiment, the step of establishing a secure communication session may include performing a secure sockets layer (SSL) protocol, a transport layer security (TLS) protocol, or a protocol associated with a virtual private network (VPN) connection that requires use of a private asymmetric key for a public key encryption algorithm such as RSA.

The at least one computer in the ATM may use the TPM to generate the public key and private keys. Once the public and private key pair is generated, the at least one computer in the ATM may cause the digital certificate to be created. This may include the ATM sending a certificate request message to a certificate authority.

A further embodiment of the ATM may include a method of using the TPM to enable devices in the ATM such as a cash dispenser to authenticate a software stack which is operative to control or otherwise communicate with the device. In this manner the device in the ATM can verify that the software used to interface with the device has not been altered or otherwise updated in a manner which is not authorized by the device itself. For example with respect to a device such as a cash dispenser, the method may comprise having a TPM in the ATM, generate at least one digitally signed measurement for at least one software component executing in at least one computer of the ATM. The method may further comprise at least one processor in the cash dispenser in the ATM authenticating the at least one digitally signed measurement. In addition, the method may comprise dispensing cash through operation of the cash dispenser responsive to the measurement being authenticated by the at least one processor in the cash dispenser.

In this described embodiment, the method may further comprise storing at least one reference measurement in at least one data store of the cash dispenser. Such a reference measurement may have been generated for an approved version of the software which must be executing in the computer of the ATM prior to the cash dispenser permitting cash to be dispensed responsive to the software component. The step of authenticating the at least one digitally signed measurement may include verifying that the at least one measurement included in the at least one digitally signed measurement corresponds to the at least one reference measurement. The step of authenticating the at least one digitally signed measurement may also include authenticating the digital signature of the digitally signed measurement using a public key associated with the TPM. In this described embodiment, a current measurement of a software component may be generated by using the TPM to create a hash or digest of the software component at the point in time the software component is initially executed in the computer of the ATM. The reference measurement may also correspond to a hash of the software component. The hash from the current measurement must be identical to the hash of the reference measurement to successfully validate the current software component.

To decrease the opportunity for the previously described "man in the middle" attack to gain unauthorized control of the cash dispenser, the method may further include the cash dispenser sending at least one random number from the cash dispenser to the at least one computer. This random number may be appended to at least one hash of the at least one software component generated using the TPM and the combination of the at least one random number and the at least one hash may be signed using the TPM to form the at least one digitally signed measurement. The step of authenticating the at least one digitally signed measurement may then include the at least one processor in the cash dispenser determining that the at least one random number received in the at least one digitally signed measurement corresponds to the at least one random number originally sent by the cash dispenser.

The at least one software component may be comprised of a plurality of software applications executing in the at least one computer which are adapted to control the operation of the cash dispenser. Examples of such software components may include cash dispenser device drivers, terminal control software applications, diagnostic software, XFS service providers, or any other software which is involved with communicating with the cash dispenser. In this described embodiment, the at least one computer may cause the at least one reference measurement to be generated for the at least one software component and to be sent to the cash dispenser for storage therein. To further enhance the security of the method, the chest or safe of the ATM which includes portions of the cash dispenser therein may further include at least one input device mounted therein. The at least one input device may correspond to a button, switch or other input device which is only accessible to a user when a chest door of the chest is in an open position. The cash dispenser may be operative to only accept initial or updated reference measurements for storage therein when an input is received through operation of the input device by the user. If the input device corresponds to a button, the cash dispenser is operative to only accept initial or updated reference measurements in response to the button in the chest being pressed by the user.

In an alternative embodiment of the method, the at least one computer in the ATM may be operative to access the at least one reference measurement from a remote server rather than by generating the reference measurement locally from the software component. The hashes for the reference measurements may be generated using a reference platform. The remote server may include the reference measurements for a plurality of different software components and versions of software components. The remote server may also be accessible by a plurality of different ATMs which may comprise different combinations of software components and/or versions of the software components.

In a further alternative embodiment of the method, the software component setup programs and/or packages may include the reference measurements therewith. When the software components are initially installed on the ATM, the setup programs may install the reference measurements in addition to the software components on the ATM. When the described input device in the chest is operated by a user, the ATM may be operative to send the reference measurements to the cash dispenser which correspond to the software components associated with the cash dispenser.

In the described embodiment, the reference measurements may also be digitally signed. If the reference measurements are generated using the TPM, the reference measurements may be signed by a private key associated with the TPM. If the reference measurements are retrieved from a remote server or are acquired from the setup programs or packages for the software components, the reference measurements may be digitally signed by the private key of an entity trusted by the ATM and/or cash dispenser.

When the reference measurements are sent to the cash dispenser, the method may include the at least one processor, authenticating the digital signatures of the reference measurements. For purposes of authenticating the current measurements and/or the reference measurements, the method may include the at least one computer sending a public key associated with the TPM to the cash dispenser for storage therein. The public key may be sent within a digital certificate associated with the TPM. The method may also include the at least one processor of the cash dispenser authenticating the digital certificate using a public key of a certificate authority stored in at least one data store of the cash dispenser. In embodiments where the reference measurements are not digitally signed using the TPM, the cash dispenser may include a data store which includes stored therein a public key of the entity which digitally signed the reference measurements. The public key of the trusted entity may be used by the at least one processor in the cash dispenser to authenticate the reference measurement while the public key of the TPM may be used by the at least one processor in the cash dispenser to authenticate the current measurements.

When the software components are updated, or otherwise modified from their previously approved form, the current measurements generated using the TPM of the modified software components will not match the reference measurements.

In this situation, the method may include the at least one processor in a cash dispenser, determining that at least one digitally signed measurement received from the at least one computer is not valid; and responsive to this determination, the method may include sending a fault message to the at least one computer.

In an embodiment, during the initialization of the cash dispenser or at other times, the method may include the processor sending a challenge message from the cash dispenser to the at least one computer, such a challenge message may include the above described random number. In response to receiving the challenge method, the at least one computer may send the current digitally signed measurements for the software components to the cash dispenser for authentication by the at least one processor in the cash dispenser.

In this described method, the cash dispenser is operative to verify that the approved software components associated with the cash dispenser have not been altered. However, to prevent an additional software component (e.g. virus, worm) from accessing or using one of the approved and authenticated software components (e.g. a device driver) the approved software components may be operative to lock themselves so as to only permit access to the software components from other approved software components.

A further embodiment involving an ATM may include a method and system for configuring the ATM to be capable of authenticating approved cash dispensing software components. Such a method may comprise at least one of installing and updating a plurality of software components in a data store of the at least one computer of an ATM. At least one of the software components may be operative to control the operation of the cash dispenser.

As described previously, the at least one computer of the ATM may be operative to use the TPM to generate a current measurement of the at least one software component when the at least one software component executes in the at least one computer. However, as not all of the plurality of software components are associated with the operation of a cash dispenser, the method may further comprise providing at least one input through an input device of the ATM which causes the at least one computer to identify which of the plurality of software components corresponds to the at least one software component that is operative to control the cash dispenser. The computer of the ATM may be adapted to be responsive to the selection of the at least one software component to configure the cash dispenser to only authenticate the software components which have been selected. As a result, only reference measurements for the selected software components need to be communicated to the cash dispenser for storage therein and only current measurements associated with the identified software components need to be communicated to the cash dispenser when the cash dispenser issues a challenge message.

As discussed previously, the process of updating the cash dispenser with new or updated reference measurements may include requiring a user to open the chest of the ATM and press a button or other input device to cause the cash dispenser to accept the new reference measurements. In an embodiment of the ATM, the operation of the input device in the chest may cause the cash dispenser to communicate a message to the computer of the ATM which requests the new reference measurements to be sent to the cash dispenser. However in alternative embodiments, the operation of the input device in the chest may place the cash dispenser in a temporary mode in which it is capable of accepting new reference measurements when sent by the computer.

Although the above described method of authenticating software components by a device in the ATM has been described using the example of a cash dispenser, it is to be understood that in alternative embodiments other types of devices including other types of transaction function devices in the ATM may be adapted to carry out these method steps to validate one or more software components executing in the computer of the ATM.

Embodiments of an ATM may include a method and system for logging into an operating system login account of the ATM using at least a portion of a password supplied from a portable storage device placed in operative connection with the ATM by a user. In one embodiment, the portable storage device may comprise a nonvolatile memory device such as a USB flash drive. In an alternative embodiment, the portable storage device may be comprised of a cryptographic token device which includes a processor capable of performing encryption and decryption operations on information stored in the device.

An embodiment of the method may comprise placing the portable storage device in operative connection with an ATM; operating an input device of the ATM to input a password such as a PIN associated with the portable storage device; and causing the at least one computer to generate an ATM account password for an operating system login account of the at least one computer in the ATM responsive to the PIN and the portable storage device. The step of generating the ATM account password may include the at least one computer, responsive to the PIN, causing at least one first portion of the ATM account password stored on the portable storage device to be decrypted. In an embodiment of the method which uses a flash drive to log into the ATM, this step may include the at least one computer of the ATM performing the decryption using the TPM. In an embodiment of the method which uses a cryptographic token device to log into the ATM, the processor of the cryptographic token device may perform the decryption of the at least one first portion of the ATM account password after the ATM has forwarded the correct PIN to the device.

In addition, the step of generating the ATM account password may include combining the decrypted at least one first portion of the ATM account password and at least one second portion of the ATM account password to generate the ATM account password. The at least one computer may then use the generated ATM account password to log into the ATM login account. When the ATM is being manufactured or otherwise configured to be capable of being logged-in in this manner, a method of setting up the ATM may include creating the login account using the ATM account password generated by the ATM as described above.

In this described embodiment, the at least one second portion of the ATM account password may be retrieved from a data store in the ATM such as a registry or other storage location for data. When the ATM is initially being configured to be logged in this manner, the at least one computer may randomly generate the at least one second portion of the ATM password and store the generated at least one second portion of the ATM password in the data store of the ATM.

The login account may correspond to an administrative account and/or an account with sufficient privileges to enable a user to access at least one software component operative to cause at least one transaction function device of the ATM to operate. As discussed previously, examples of transaction function devices in an ATM may include a cash dispenser, a depository; and EPP.

In embodiments of the ATM in which a flash memory device is used to log into the account, the ATM may include a TPM, and the method may include decrypting the at least one first portion of the ATM account password using the TPM of the ATM. In this described embodiment, the at least one computer may receive at least one input (e.g. a PIN) through at least one input device of the ATM. The at least one computer may also access a credential from the portable storage device and validate the input using the credential. The at least one computer may then decrypt the at least one first portion of the ATM account password using the at least one input.

In this described embodiment, the at least one input may be inputted through use of an input device such as the keypad of the ATM. The at least one computer may generate a symmetrical encryption key using the at least one input and may decrypt the at least one first portion of the ATM account password using the key generated from the input to produce an intermediately encrypted at least one first portion of the ATM account password. The at least one computer may then decrypt the intermediately encrypted at least one first portion of the ATM account password with another symmetrical key accessed using the TPM to produce the at least one first portion of the ATM account password. The symmetrical key accessed using the TPM may be stored in the TPMs (or in files protected using the TPMs) of a plurality of different ATMs, enabling the same portable storage device to be used to log into each of the plurality of different ATMs according to the embodiments of the described method.

To verify the input using the credential retrieved from the portable storage device, the at least one computer may generate a hash from the at least one input and may verify that the generated hash matches a further hash in the credential. In addition, the computer may verify that a digital signature of the credential corresponds to the valid signature of a certificate authority trusted by the ATM.

In embodiments of the ATM in which a portable storage device corresponding to a cryptograph token device is used to log into the account, the ATM may not include a TPM. In this embodiment, the method may include receiving through an input device of the ATM at least one input and communicating the at least one input from the ATM to the portable storage device. Here the at least one input may correspond to a password or PIN associated with the portable storage device. A processor in the portable storage device may be operative to validate the input. Responsive to validating the input, the processor in the portable storage device may decrypt the at least one first portion of an ATM account password stored on the portable storage device and may communicate the decrypted at least one first portion of the ATM account password from the portable storage device to the ATM.

To enable the ATM and the portable storage device to authenticate each other, the method may include communicating at least one digital certificate from the portable storage device to the ATM. This digital certificate may include a public key associated with the portable storage device. The digital certificate may be signed by a certificate authority trusted by the ATM and the method may include at least one computer authenticating the signature on the digital certificate. The method may then include at least one computer generating and communicating a random number from the ATM to the portable storage device. When the random number is received from the ATM, the method may include the processor in the portable storage device signing the random number using a private key associated with the public key included in the digital certificate. The processor in the portable storage device may then communicate the signed random number from the portable storage device to the ATM, and the at least one computer may verify the signature using the public key. The at least one computer may also verify that the random number returned from the portable storage device matches the random number sent from the ATM.

The at least one computer may then direct that the portable storage device decrypt the at least one first portion of the account password and communicate the at least one first portion of the account password to the ATM. The at least one computer may then combine the at least one first and the at least one second portions to produce the full ATM account password and log into the login account as discussed previously.

In these described embodiments, after the input from the user (e.g. PIN) is validated by either the at least one computer or the processor in the portable storage device, the method may include automatically generating the ATM account password and logging into the login account without any further inputs from the user. However, in an alternative embodiment, the at least one computer may output a user interface through an output device of the ATM which includes a selectable menu option associated with the function of logging into the login account. Responsive to receiving a further input through at least one input device of the ATM corresponding to the menu option, the at least one computer may proceed through the steps of logging into the login account of the ATM.

In the described embodiments, the credential and/or the certificate stored in the portable storage device may include at least one identification number which may be compared to a listing of identification numbers stored in a data store of the ATM. The at least one computer may require the identification number of the credential/certificate to be included in the listing before proceeding with logging into the login account. However, if the listing corresponds to a list of revoked credentials/certificates, the at least one computer may verify that the identification number of the credential/certificate is not included in the listing before proceeding with logging into the login account.

In the described embodiments, once the at least one computer has logged into the login account the user may be capable of accessing software components which operate, service, and/or configure software and hardware components in the ATM. Thus an embodiment of the method may further include the at least one computer executing a software component operative to service or configure a transaction function device such as the cash dispenser in the ATM or a software application such as a software component operative to enable customers to perform financial transactions with the ATM.

As discussed previously a method of enabling an ATM to be capable of using portable storage devices to log into a login account may include randomly generating and storing the at least one second portion of the account password in the ATM. This method may also include creating and/or updating a login account of the operating system of the at least one computer so that the login account is associated with the account password. To perform this step, the method may include generating the account password from the first and second portions of the account passwords. Because the first portion of the account password is not generated by the ATM as is the second portion, the method may include acquiring the at least one first portion from a portable storage device placed in operative connection with a port of the ATM as discussed previously. Alternatively, the first portion of the account password may be acquired from another source such as from a server in operative connection with the ATM. Once the first portion of the account password is acquired, the at least one computer may combine it with the randomly generated second portion to produce an account password usable for initially setting or changing the password associated with the login account.

For ATMs which include a TPM, the method may include storing the previously described symmetrical key usable to decrypt the first portion of the ATM account password in the TPM. The method may also include installing the certificate of the certificate authority which is usable to authenticate the previously described credential or certificate stored on the portable storage device.

In this described method of configuring ATMs to be capable of logging into a login account using a portable storage device, the method may also include configuring a plurality of portable storage devices to have stored thereon the encrypted at least one first portion of the account password. For a portable storage device that corresponds to a flash drive the method steps of configuring the portable storage device may include storing a credential on the flash drive which is usable to validate a PIN capable of being used to decrypt the at least one first portion of the account password. This method may include: generating a credential which includes a hash of the PIN; having the credential signed by a certificate authority; and storing the credential on the portable storage device. This method may also include encrypting the at least one first portion of the ATM account password with a symmetrical key that is also stored in the TPMs of a plurality of ATMs to form an intermediately encrypted at least one first portion of the account password. The method may also include generating a further symmetrical key from the PIN and encrypting the intermediately encrypted at least one first portion of the account password with the key generated from the PIN. The resulting encrypted at least one first portion of the account password may then be stored on the portable storage device.

For a portable storage device that corresponds to cryptographic token device with a processor, the method steps of configuring the portable storage device may include causing a processor in the portable storage device to generate a public key and a private key pair. The public key may then be incorporated into a digital certificate signed by a certificate authority and the digital certificate may be stored on the portable storage device. The method may further include causing the at least one first portion of an ATM account password to be stored on the portable storage device in an encrypted form capable of only being decrypted through operation of the processor in the portable storage device.

Embodiments of an ATM may include a method and system for ensuring that components in the ATM have not been modified, updated, altered, or otherwise compromised prior to enabling the ATM to boot into a fully functional state. Such a method may include through operation of a TPM included with at least one computer in the ATM, verifying that at least one component of the ATM has not been altered and responsive to this determination enabling the machine to dispense cash through operation of a cash dispenser in the ATM.

Embodiments of an ATM may also include using the processor in the EPP to decrypt other information besides keys sent from a host banking system to the ATM. Such information may include data in addition to keys, information such as screen data, configuration data, and/or any other information usable by the ATM to operate. Such a method may include receiving encrypted data from a host banking system with an automated banking machine, wherein the automated banking machine includes at least one computer, a cash dispenser, and an EPP; and the EPP includes at least one processor. The method may further include decrypting the data through operation of the at least one processor of the EPP; sending the decrypted data from the EPP to the at least one computer of the automated banking machine; and responsive to the decrypted data, through operation of the at least one computer, causing the cash dispenser to dispense cash.

In a further embodiment in which the decrypted data corresponds to screen data, the method may include 1, receiving encrypted screen data from a host banking system with an automated banking machine, wherein the automated banking machine includes at least one computer, a cash dispenser, at least one display device and an EPP; and the EPP includes at least one processor. This described method may also include decrypting the screen data through operation of the at least one processor of the EPP. The method may also include through operation of the at least one computer, causing the at least one display device to produce a visual output corresponding to at least a portion of the screen data.

In an embodiment of the banking machine that includes a TPM, this described method may further include, encrypting the decrypted data such as the screen data using the TPM and storing the data encrypted with the TPM in at least one data store of the automated banking machine. When needed to produce a visual user interface output through the display device of the machine, the portions of the encrypted data corresponding to the desired screen data may then be selectively retrieved from the at least one data store and decrypted with the TPM.

Although the above-described embodiments have included methods, it is to be understood that further embodiments may include ATM systems and other apparatuses operative to carry out the above-described method steps.

BRIEF DESCRIPTION OF DRAWINGS

FIG. 9 is a schematic view showing a method in which a portable storage device is used to authenticate a user logging into a login account of the operating system of the automated banking machine.

FIG. 10 is a schematic view showing an alternative method in which a portable storage device is used to authenticate a user logging into a login account of the operating system of the automated banking machine.

DETAILED DESCRIPTION OF EXEMPLARY EMBODIMENTS

Figure 1:
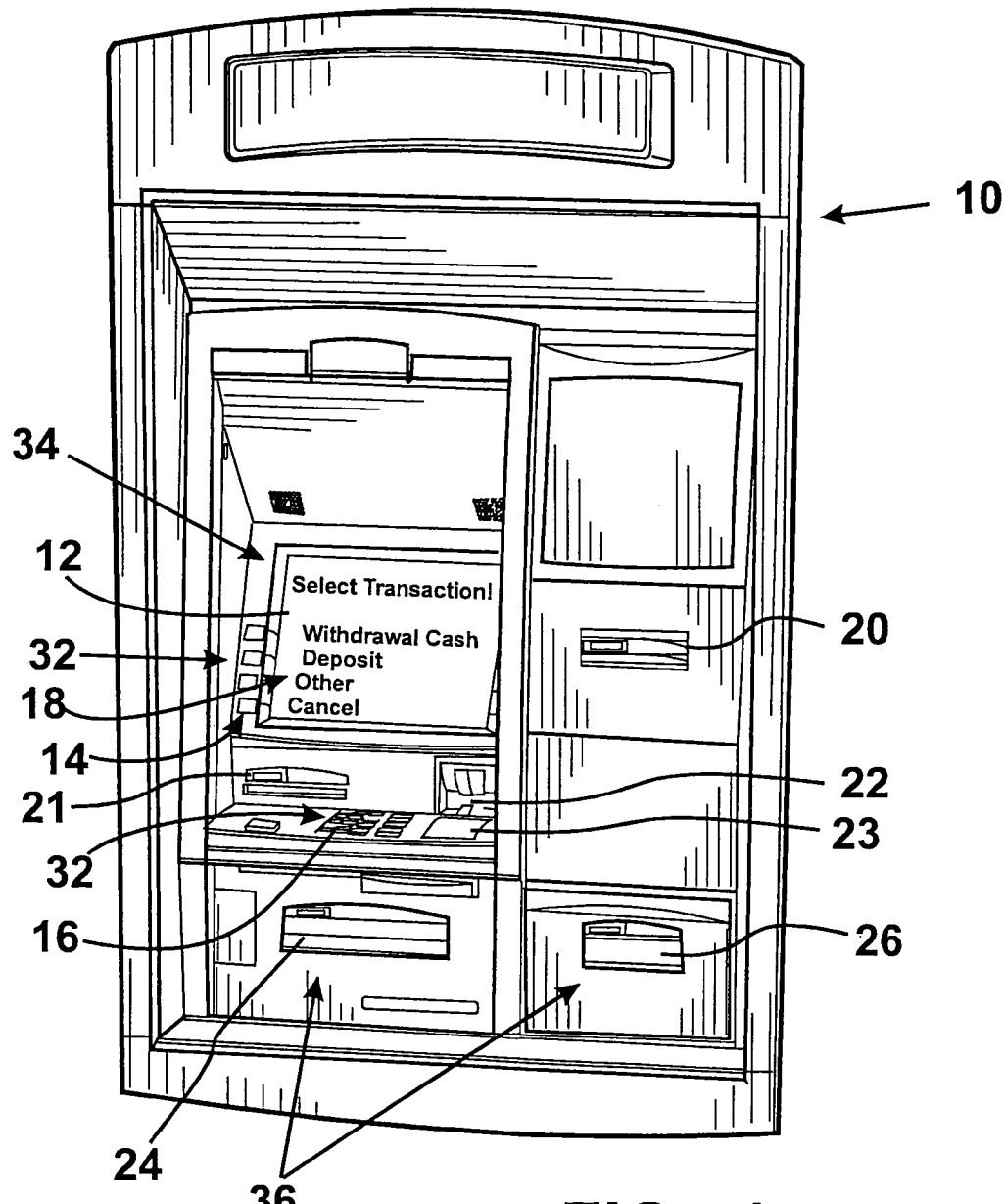
FIG. 1 is a perspective view representative of an embodiment of an automated banking machine.

Referring now to the drawings and particularly to FIG. 1, there is shown therein a perspective view of an embodiment of an automated banking machine 10. Here the automated banking machine 10 may include at least one output device 34 such as a display device 12. The output device 12 may be operative to provide a consumer with a user interface 18 that may include a plurality of screens or other outputs including selectable options for operating the machine. The embodiment may further include other types of output devices such as a receipt printer 20, statement printer 21, speakers, or any other type of device that is capable of outputting visual, audible, or other sensory perceptible information.

The embodiment of the automated banking machine 10 may include a plurality of input devices 32 such as an encrypting pin pad (EPP) with keypad 16 and function keys 14 as well as a card reader 22 and/or bar code reader 23. The embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The embodiment of the automated banking machine 10 may further include a plurality of transaction function devices which may include for example a cash dispenser 24, a depository mechanism 26, a cash recycler mechanism, or any other type of device which is operative to perform transaction functions involving transfers of value.

Figure 2:
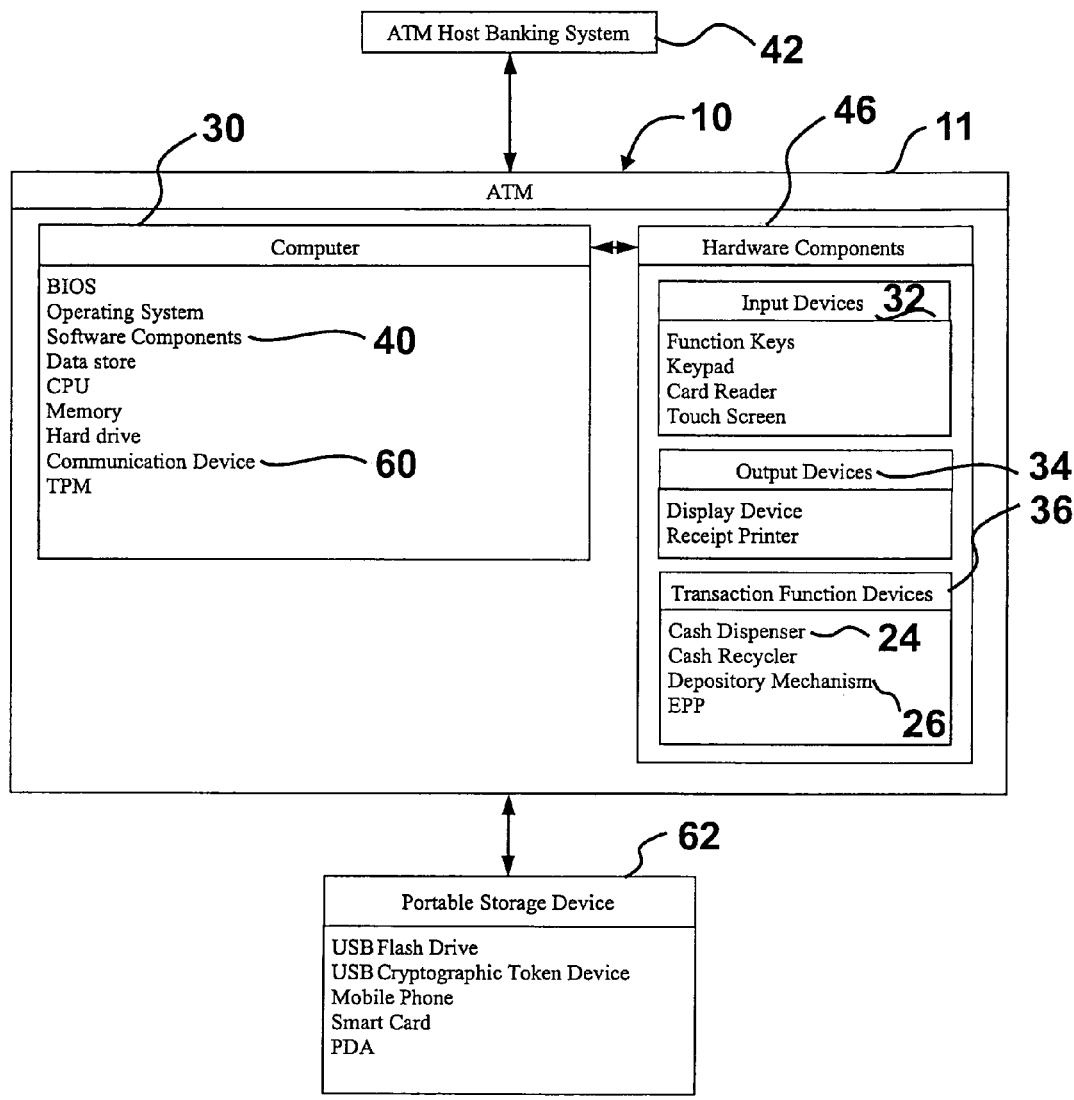
FIG. 2 is a schematic view of an embodiment of an automated banking machine.

FIG. 2 shows a schematic view of components which may be included or may be in communication with the automated banking machine 10. In this described embodiment the input devices 32, output devices 34, transaction functions devices 36, and a computer 30 may be in supporting connection with a housing 11 of the machine. A detailed example of an ATM housing and associated components is shown in U.S. Pat. No. 7,040,534 B2 of May 9, 2006 which is hereby incorporated herein by reference.

Embodiments of the automated banking machine 10 may be operative to communicate with a transaction processing server which is referred to herein as an ATM host banking system 42. Such an ATM host banking system 42 may be operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

The computer 30 may be in operative connection with a plurality of components. Such components may include both hardware components 46 and software components 40. The hardware components 46 may correspond to the previously described input device(s) 32, output device(s) 34, and transaction function device(s) 36. In an embodiment, a transaction function device may be operative to perform a transaction function in response to at least one input through at least one of the input devices.

In an embodiment of an ATM, the software components may correspond to one or more terminal control software components that are operative in the computer 30. The terminal control software components may be operative to control the operation of the machine by both a consumer and an authorized user such as a service technician. For example such terminal control software components may include applications which enable a consumer to dispense cash, deposit a check, or perform other transaction functions with the machine. In addition the terminal control software components may include applications which enable a service technician to perform configuration, maintenance, and diagnostic functions with the machine.

In an embodiment of an ATM, both software components and/or hardware components may be operative to communicate information with each other through the computer and/or through a communication system associated with the computer. Such information may be encrypted to protect confidential information from threats of intruders. Examples of methods and systems usable by components to authenticate each other in an ATM are shown in U.S. application Ser. No. 10/746,276 filed Dec. 26, 2003 which is hereby incorporated by reference herein.

Figure 3:
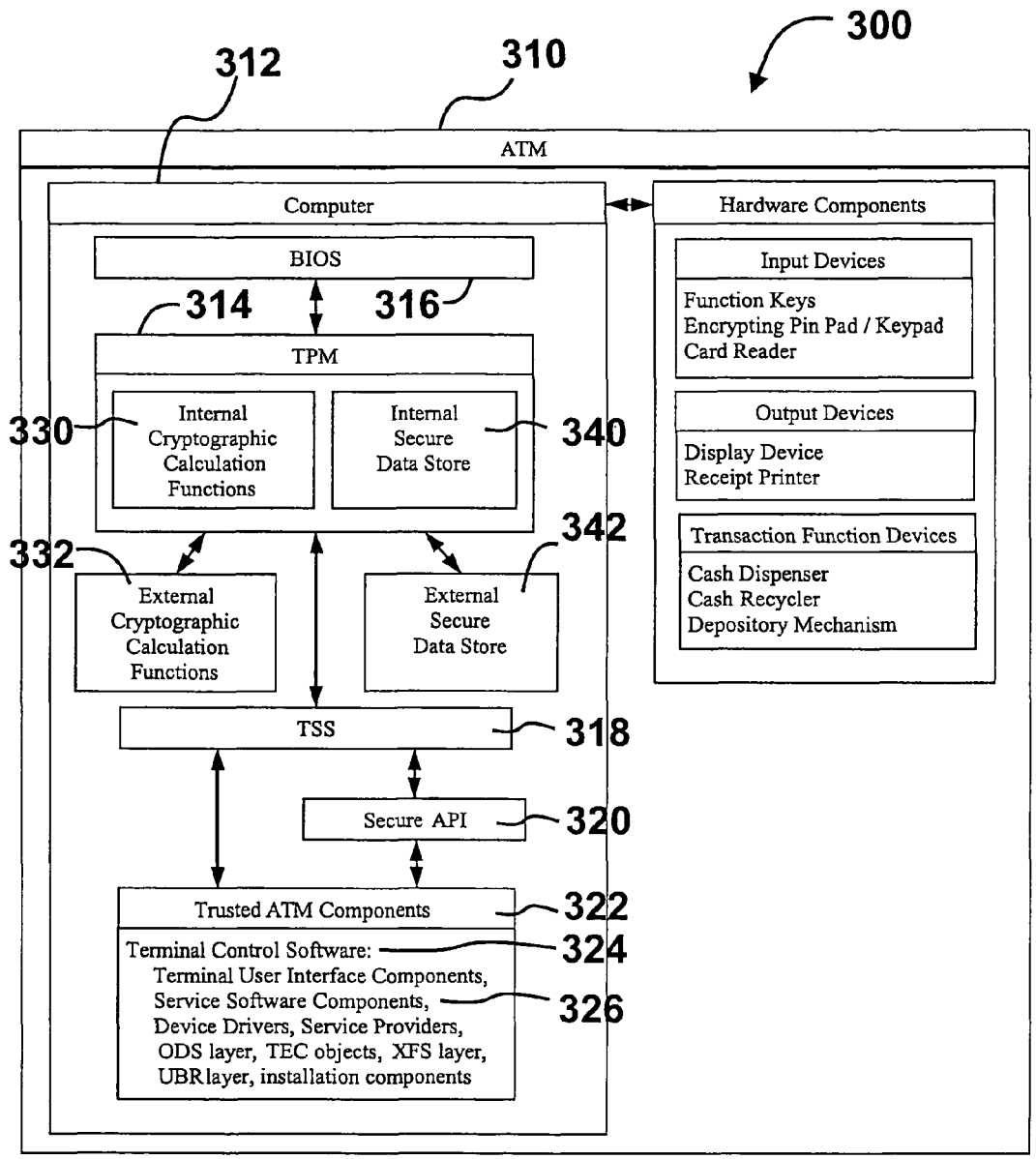
FIGS. 3-6 show schematic views of embodiments of automated banking machines which comprise trusted platforms with trusted platform modules.

Embodiments of an automated banking machine such an ATM may include a trusted platform (TP) which may also be referred to as a trusted computing platform or a trusted computer base (TCB). FIG. 3 shows an embodiment of a trusted platform (TP) 300 for an ATM 310. The ATM 310 may include a computer 312. The computer 312 may include a motherboard with a Basic Input-Output System (BIOS) 316 or an Extensible Firmware Interface (EFI). The computer 312 may further include a trusted platform module (TPM) 314 that complies with a trusted platform specification such as the Trusted Computing Platform Alliance (TCPA) specification, Trusted Computing Group (TCG) specification, Microsoft next-generation secure computing base (NGSCB) (formerly called Palladium), Intel LaGrande Technology, Microsoft Longhorn TPM Services Architecture, or other TP specification for establishing a trusted and secure computing environment.

In embodiments of an ATM, the TPM may be comprised of one or more computer chips integrated into the motherboard of the computer 312 or otherwise placed in operative connection with a computer processor of the ATM. An example of a TPM which may be used with embodiments of an ATM includes a TPM SLD 9630 chip of Infineon Technologies AG which is based on the TCPA Main Specification version 1.1b. In other embodiments the ATM may include a TPM which corresponds to other specifications for a TPM such as the Trusted Computer Group TPM 1.2 Specification or later developed specifications.

Also, in embodiments of an ATM, the TPM may correspond to Microsoft's specification for a security support component (SSC) for the Microsoft NGSCB. In alternative embodiments, the TPM may also be incorporated into the processor of the computer of the ATM, hardware card, or other device in operative connection with the computer processor of the ATM.

As used herein, a TP corresponds to hardware and software components of a computer that conform to a trusted platform specification such as the TCPA Main Specification version 1.1b, the TPM 1.2 specification, Intel's LaGrande Technology Specification, Microsoft's NGSCB, Microsoft's Longhorn TPM Services Architecture or another trusted platform specification which uses a TPM.

As used herein, the TP may be described as being used to perform functions which may require the use of a TPM. However, it is to be understood that in addition to the TPM, software associated with the TPM may also be involved in the performance of functions for the TP. Such software many include a trusted portion or kernel of the operating system such as a "nexus" in Microsoft's NGSCB specification. Such software may further include a trusted application, nexus computing agent (NCA), protected applet, application programming interface (API), software stack, or other software component that enables the TP to perform the described function. As used herein and in the claims, references to using a TP to perform a particular cryptographic calculation, authentication, or other function may include the use of the TPM chip and/or other software or hardware components which comprise the TP such as a nexus or NCA.

The ATM 310 shown in FIG. 3 includes a TP 300 that conforms to the TCPA Main Specification Version 1.1b. Here the TP of the ATM 310 may include a TPCA Software Stack (TSS) 318 or other library which may provide modules and components that provide the supporting functionality to the TPM.

The ATM 310 may further include a secure API 320 which provides a set of functions that ATM software 322 may use to configure and communicate with the TPM through the TSS. In an embodiment of the ATM, the secure API may include functions for accessing on-chip cryptographic hardware functions 330 of the TPM such as encryption, decryption hashing, and key generation. Examples of on-chip encryption and decryption functions that may be accessed through the secure API may include RSA, AES, DES, and Triple DES. In an embodiment of the ATM, the terminal control software 324 may perform encryption and decryption operations involved with the performance of transactions for consumers and servicers using the on-chip functions of the TPM. In alternative embodiments the ATM software may be operative to communicate with the TPM through direct access to the functions of the TSS. In further alternative embodiments, the ATM software may be operative to communicate with the TPM through the cryptography library of the operating system. In a Microsoft operating system, such a cryptography library may include a Microsoft cryptography API (CAPI), for example.

Figure 4:
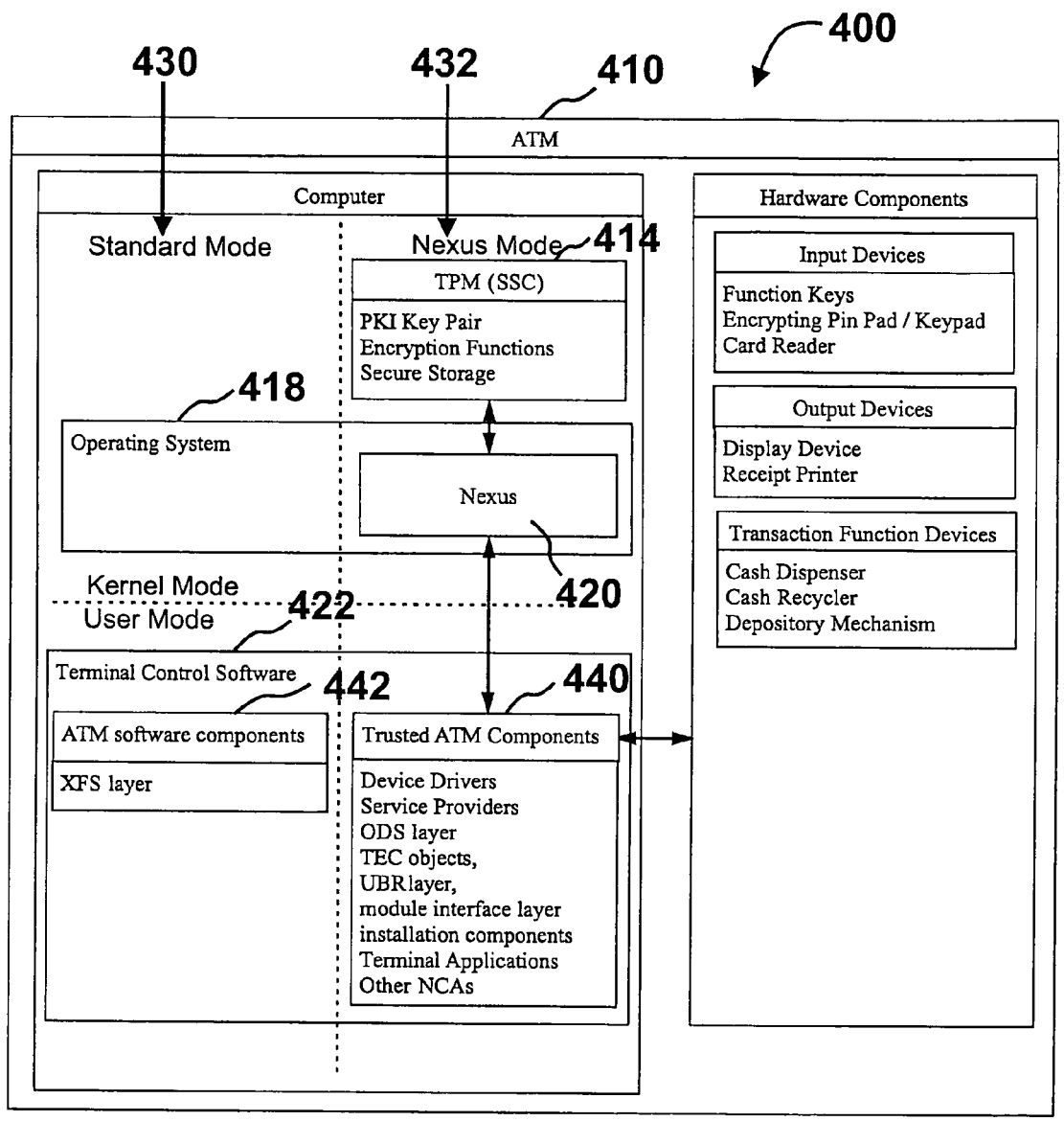

FIG. 4 shows an embodiment of a TP 400 for an ATM 410 which conforms to the Microsoft's NGSCB specification. Here the TPM chip 414 may correspond to or may be referred to as a security support component (SSC). Also, with this specification the software which interfaces with the TPM chip may include the NGSCB nexus 420 or other secure kernel or component of an operating system 418. In this described embodiment the TPM may correspond to the TPM 1.2 specification released by the Trusted Computing Group.

An ATM with a NGSCB trusted computing platform may include two modes of operation referred to as the standard mode or left hand side 430 and the nexus mode or right hand side 432. Both modes may be operative at the same time on a computer of the ATM. Legacy applications which are not designed for use with a TPM 414 may execute in the standard mode of the platform. Trusted applications which are designed to use features of the TPM may be granted permission to operate in the nexus mode 432. Such trusted applications include the NGSCB nexus 420, nexus computing agents (NCAs), and/or other software components which are adapted to operate in the nexus mode.

In an embodiment of the ATM 410, at least one of the terminal control software components 422 of the ATM may be granted permission to operate in the nexus mode. In a TP based on Microsoft's NGSCB specification such components may be programmed to use features of the TPM through communication with the nexus 420. As used herein, terminal control software components which interface with a TPM and/or which operate in the nexus mode are referred to as trusted ATM components 440. In a TP based on Microsoft's NGSCB such trusted ATM components may correspond to NCAs for example.

Figure 5:
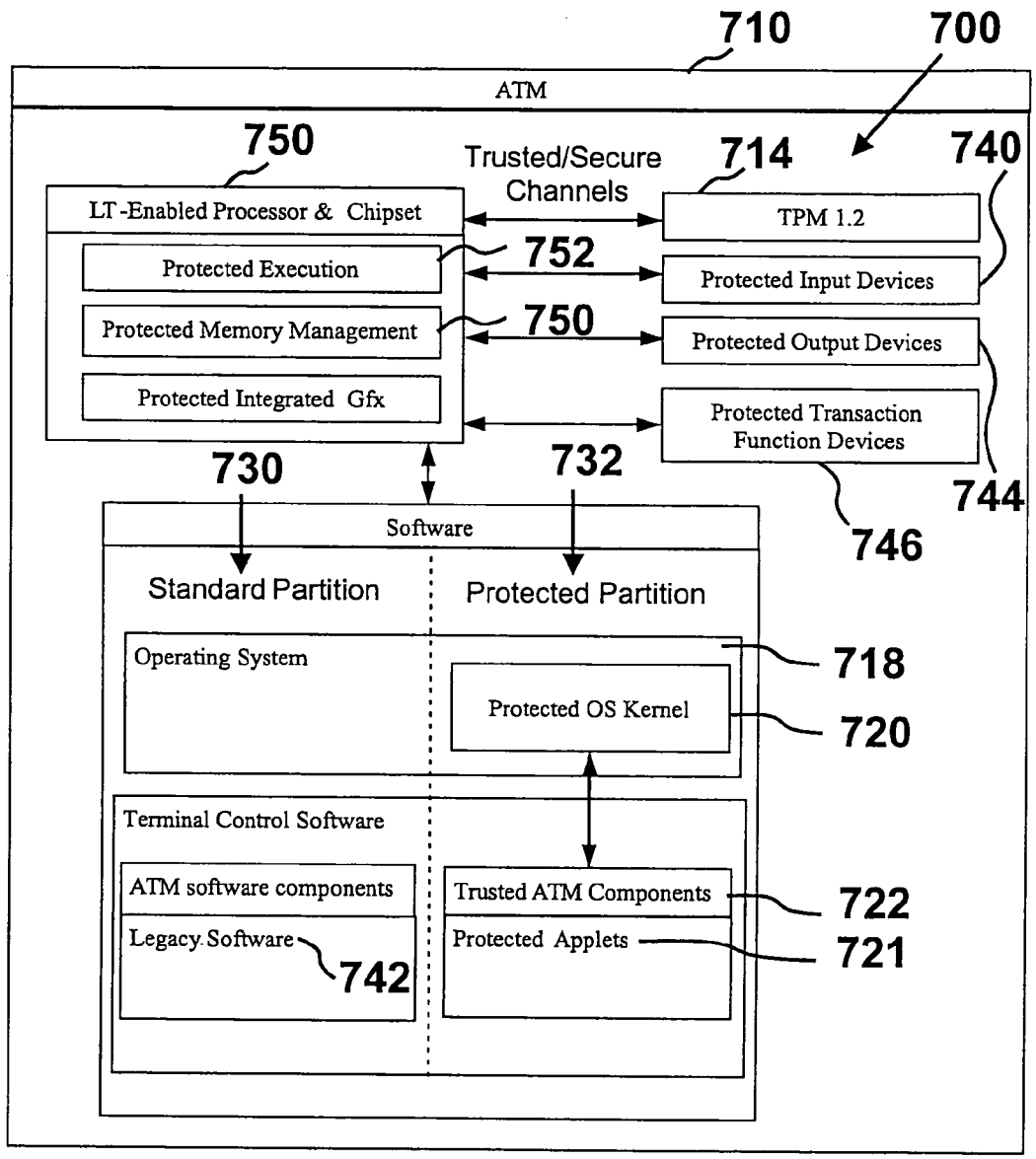

FIG. 5 shows an embodiment of a TP 700 for an ATM 710 which conforms to the Intel LaGrande Technology (LT) specification. Here the TPM 714 may correspond to one or more chips integrated with a motherboard of the computer of the ATM. In other embodiments, the TPM may be integrated into the computer processor of the ATM. In this described embodiment the TPM may correspond to the TPM 1.2 specification released by the Trusted Computing Group.

In the LT specification, the software which interfaces with the TPM chip may correspond to the NGSCB nexus or other secure or protected kernel 720 or component of an operating system 718. As with the previously described NGSCB TP, the LT TP may include two modes of operation referred to in the LT specification as the standard partition or public area 730 and the protected partition or vault 732. Both modes may be operative at the same time on a computer of the ATM. Legacy applications 742 which are not designed for use with the TPM 714 may execute in the standard partition of the platform. Trusted applications which are designed to use the TPM may be granted permission to operate in the protected partition 732. Such trusted applications may include a protected kernel 720 such as the NGSCB nexus, and protected applets 721 and/or other software components which are adapted to operate in the protected partition.

In an embodiment of the ATM 710, at least one of the terminal control software components 722 of the ATM may be granted permission to operate in the protected partition 732. In a TP based on Intel's LT specification, such components may be programmed to use features of the TP 700 through communication with the protected kernel 720. As used herein, terminal control software components which operate in the protected partition defined by the LT specification are also referred to as trusted ATM components 722 and may correspond to protected applets 721.

Examples of trusted ATM components which are operative in the nexus mode or protected partition of the TP may include components which communicate financial information such as account data to a remote host banking system. Other examples of trusted ATM components may include service providers, device drivers, or other portions of the device interface layer of the ATM which communicate with input devices, output devices, and transaction function devices such as a cash dispenser, cash recycler, or depository mechanism. In addition, trusted ATM components may include the terminal applications and/or configuration components for use with servicing, installing, maintaining or configuring the ATM. Further, trusted ATM components may include software for generating a user interface usable by a customer to cause the ATM to perform financial transactions and functions such as the dispense of cash.

Although, in an ATM which conforms to the NGSCB or LT, all of the terminal control software may be programmed to operate in the nexus mode or protected partition, in other embodiments one or more of the terminal control software components may continue to operate in the standard mode 430 (FIG. 4) or standard partition 730 (FIG. 5) of the computer of the ATM. For example, legacy ATM software components 442, 742 such as a WOSA/XFS (Windows Open Services Architecture/eXtensions for Financial Services) manager or other extensions for financial services (XFS) layer or other device interface layer may continue to operate in the standard mode or partition. However, other components, such as software components which have access to secure financial information and/or items of value (i.e. cash and/or deposits) may operate on the nexus mode or protected partition of the TP.

Figure 6:
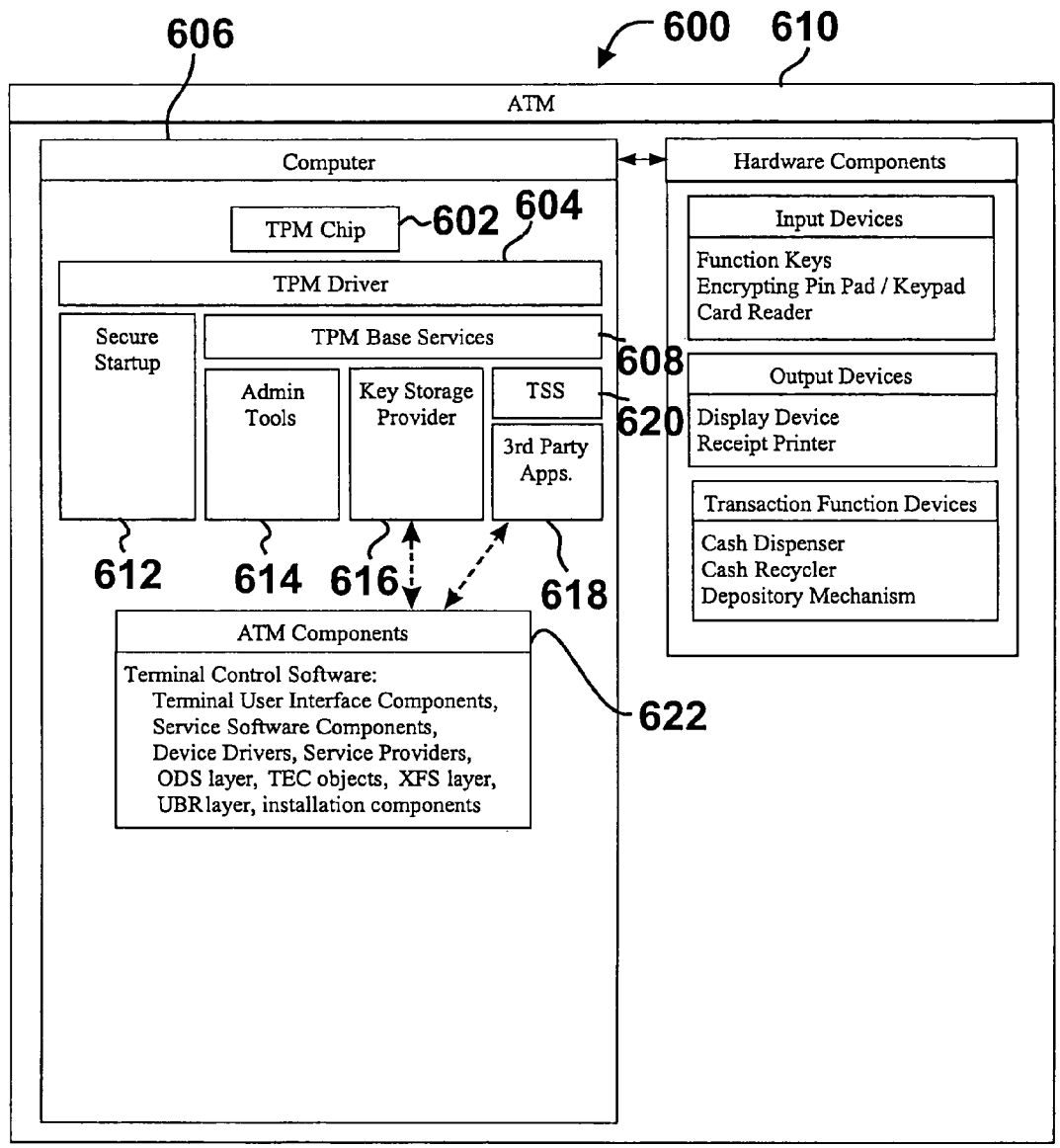

FIG. 6 shows a further embodiment of a TP 600 for an ATM 610 which conforms to a specification as discussed in the "Trusted Platform Module Services in Windows Longhorn" paper issued Apr. 25, 2005 by Microsoft for a trusted platform as proposed for use with the Microsoft® operating system referred to as "Windows Longhorn" or "Windows Vista". Here the operating system may include a TPM driver 604 capable of interfacing with a TPM chip 602 of the computer 606 of the ATM. The TPM driver 604 may be kernel-mode device driver for use with TPM chips that are compatible with the Trusted Computing Group 1.2 specification or later developed trusted computing specification. The TPM Base Services 608 may be a service of the operating system that enables sharing of TPM resources and may be operative to provide a scheduler that coordinates access among application threads using the TPM.

As shown in FIG. 6, components of the operating system operative to use features of the TPM may include a secure startup component 612, administrative tools component(s) 614, and a key storage provider component 616. The secure startup component 612 may use the TPM to protect the integrity of the partition of the computer which stores the operating system components. The secure startup component may communicate with the TPM during the initial boot of the operating system through use of a Trusted Computing Group compliant Basic Input-Output System (BIOS) or an Extensible Firmware Interface (EFI) and the TPM driver. The secure startup component may decrypt portions of the operating system and/or verify that portions of the operating system have not been altered prior to enabling the portions of the operating system and/or other software components of the ATM to be executed by the computer of the ATM. The TPM administration tools components 614 may include user interface tools for common TPM administration functions. The key storage provider component 616 may be used by applications to access basic cryptographic functions of the TPM such as the functions for generating private keys, signing and other encryption tasks.

The operating system may include a TSS 620. The TSS may correspond to a Trusted Computing Group Software Stack capable of being used by third party application 618 to access features of the TPM. The TSS 620 may be similar to the TSS 318 discussed preciously with respect to FIG. 3 and conform to the Trusted Computing Group specified architecture for software components that support applications using a TPM. The TSS 620 may be adapted to interface with the TPM through the TPM Base Services 608 of the operating system. A TSS may also be referred to as a Trusted Software Stack.

In embodiments of the ATM, ATM software components may correspond to the third party applications 618 which access the TPM through communication with the TSS. Also rather than or in addition to communicating with the TSS, ATM software components may be adapted to communicate with the Key storage provider 616 and/or the Administration Tools 614 of the operating system to access features of the TPM.

In embodiments of the ATM, trusted ATM components may use one or more of the following mechanisms of one or more of the previously described TP specifications: curtained execution, sealed storage, secure I/O, and attestation. With curtained execution, a trusted ATM component is isolated from software that is not trusted by the trusted ATM component. With sealed storage, the trusted ATM component has access to secret information stored in the sealed storage in a data store of the ATM which is not available to other software unless the other software is trusted by the trusted ATM component. With attestation, the trusted ATM component has access to an authentication mechanism which enables the component to prove its identity to other software components located on the ATM or remote from the ATM. With secure I/O, the trusted ATM component is operative to receive secure inputs or send secure outputs through secure or protected input and output devices of the ATM.

With respect to curtained execution, embodiments of the computer processor, associated chipsets 750 of the computer motherboard, TPM, and/or protected kernel of the TP may include protected memory management 750 and protected software execution 752 as defined by the TP specification of the TP of the ATM. Such protected memory management and protected software execution may place software processes and other data stored in memory and executing in the processor, in an encrypted, isolated, and/or protected form to prevent unauthorized rogue components such as a virus or worm from acquiring information about software processes and associated data from the processor and memory of the ATM.

With respect to sealed storage, the TP may be used to manage the storage of secret information in one or more data stores of the ATM. Such sealed storage may include an internal data store 340 such as a nonvolatile RAM or registers located in the TPM. Such sealed storage may also include a data store 342 which is external to the TPM such as an encrypted file on a hard drive. Information stored in the sealed storage may be encrypted by the TP using public keys and an RSA cryptography algorithm and/or symmetric keys using a symmetric cryptography algorithm.

Information used by an ATM such as secret keys, signature keys, verification keys, encipherment keys, decipherment keys, private keys, public keys, and authorization keys or other critical information used in the operation of the ATM may be securely stored in the ATM in the sealed storage through use of the TP. For example, secret keys used by an (EPP) may be stored in an internal or external data store managed through use of the TP. Also, private keys used for creating digital signatures for the ATM may be securely stored using the TP. The ATM may use the TP to sign messages using the private keys stored using the TPM. Examples of other information that may be securely stored in sealed storage of the ATM using the TP may include transaction information and information regulated by government or industry such as anti-fraud mechanism information for areas such as bulk note tables, canister mappings, account access, transaction journals, and repudiation.

In embodiments of the ATM, a trusted ATM component may through use of the sealed storage features of the TP cause information to be stored in an encrypted form in a sealed storage in a data store of the ATM using a key associated with the trusted ATM component. Such a trusted ATM component may correspond to the owner of the information. This described embodiment of the TP may enable the owner-trusted ATM component to use the TP to retrieve and return the information stored in the sealed storage back to the owner-trusted ATM component. The owner-trusted ATM component may also selectively grant permission to another trusted ATM component to access through use of the TP the information stored in the sealed storage by the owner-trusted ATM component.

With respect to secure I/O, the TP may be adapted to securely communicate with one or more protected input 740 and output devices 744. In embodiments of the ATM, the computer may include a trusted keyboard controller or other trusted input device controller adapted for use with a TP. The trusted input device controller may be operative to form a trusted secure communication channel with the one or more protected input devices through which communications can be securely transmitted to a trusted ATM component. The secure communications may be encrypted, for example, such that unauthorized software operating on the ATM cannot determine the unencrypted form of the information being inputted through use of the protected input device. In an embodiment of the ATM, the trusted ATM components are operative responsive to the secure communications received from a protected input device to cause transaction function devices to operate. For example, with a protected touch screen or keypad input device for example, communications between a trusted ATM component and the touch screen or keypad may be encrypted such that a virus, worm or other unauthorized component operating in the computer of the ATM would be unable to acquire private information from the touch screen or keypad such as a user's PIN (Personal Identification Number) or other information. Further, with a protected card reader, for example, communications between a trusted ATM component and the card reader may be encrypted such that an unauthorized component operating in the computer of the ATM would be unable to acquire private information read from a card with the card reader such as an account number.

In addition, one or more of a video graphics controller, receipt printer, statement printer, passbook printer, or other output device of the ATM may correspond to protected output devices 744. For example, the ATM may include a protected video graphics controller that is adapted for use with a TPM of a TP. Secure communication between the computer processor of the ATM and the protected video graphics controller may be encrypted such that a virus, worm or other unauthorized software would be unable to acquire private information sent to the video graphics controller or video memory such as the display of account information. Further, the encryption of communications to a video graphics controller may minimize the opportunity for unauthorized software to cause the display device to output incorrect information or commands. For example by encrypting data associated with the formation of a visual user interface sent to a video graphics controller, an unauthorized software application may be prevented from prompting a user to input PIN information at a time when the EPP of the machine is not in a proper mode to encrypt the PIN.

In addition to protected input and output devices, other devices of the ATM such as transaction function devices 746 may also be adapted for use with a TP. For example, the TP may be used to establish a secure communication channel between a trusted ATM component and one or more transaction function devices such as a cash dispenser. The trusted ATM components and transaction function devices may be operative to send one or more encrypted messages through the secure communication channel which causes the transaction function devices to operate and/or which communicates data between the transaction functions devices and the trusted ATM components. Examples of such messages may include command messages and status messages. In an embodiment of the ATM, a device controller such as a USB controller or other hardware controller of the computer of the ATM may be adapted for use with a TP to establish the secure communication channel between the computer and the transaction function devices connected to the controller. Further examples of establishing secure connections between a computer in the ATM and hardware devices in the ATM are discussed below.

The TP may be used to perform cryptographic processes such as asymmetric and symmetric encryption and decryption for trusted ATM components. The TP may also be used to perform key generation, public/private key pair generation, random number generation, hash generation, digital signature generation, and digital signature verification for trusted ATM components. In addition, the TP may be used to provide a report or attestation to the current configuration of the ATM or other information. For example, the TP may be used in acquiring and/or verifying information about trusted ATM components and hardware device installed on the ATM.

With respect to attestation, the information acquired about a component of the ATM for attestation using the TP is referred to herein as a measurement of the component. Such a measurement may take place when the ATM is initially booted when software initially executes, or at other times during the operation of the ATM. The measurements may be securely stored using the TP and used later to determine if the configuration of the ATM has changed.

In an embodiment of the ATM, a trusted ATM component and/or an external system remote from the ATM such as a host banking system may be operative to verify the information about the measured components of the ATM. The TP may be used to attest to the information about the measured component by digitally signing the measurement of the component with a private key of the TPM. The digitally signed measurement or hash may be sent to the software application, device, and/or external system which requested information about the measured component and/or a measured configuration of the machine.

In an embodiment of the ATM, the TPM may include at least one private key securely stored in the TPM chip. The TPM may further include at least one digital certificate that includes the public key which corresponds to the private key stored in the TPM. Such a digital certificate may be signed by a certificate authority associated with the manufacture of the motherboard, TPM or ATM for example.

The TPM may also be operative to store additional public and private keys and corresponding digital certificates. The additional digital certificates associated with the TPM may be signed by a certificate authority which enables them to be verified by authenticating the signature of the certificate authority. In an embodiment of the ATM, the TPM may be operative to provide a root of trust for the ATM through a PKI infrastructure. The TPM may be operative to extend its trust to one or more components of the ATM, such as a nexus and trusted ATM components, by building a chain of trust. Also, trusted ATM components may be operative to extend their trust to other components.

In an embodiment of the ATM, the TP of the ATM may be used to enable the computer of the ATM to boot into a known state with hardware and software that is verified through use of the TPM. In this described embodiment, the ATM software 322 such as the terminal control software may include trusted ATM components that are operative to audit the configuration of the ATM. Such auditing ATM components may through use of the TP acquire measurements for a plurality of the software and/or hardware components of the ATM. The results of the measurements may be compared to know authorized configurations of valid measurements of the components. In an embodiment of the ATM, such authorized configurations may be digitally signed to prevent undetected unauthorized modifications to the authorized configurations.

In alternative embodiments, the authorized configurations may be stored in a data store managed by a remote system such as a server associated with a host banking system. Prior to authorizing the ATM to perform transaction functions or at startup, the host banking system may communicate with the ATM to direct that the trusted ATM components acquire measurements of one or more devices of the ATM. The measurements may be returned to the host banking system for verification against the known authorized configurations for the ATM. If the measurements do not correspond to valid measurements of one or more authorized configurations for the ATM, the host banking system may be operative to prevent the ATM from performing transactions.

In an embodiment of the ATM, the TP may be used to measure components as soon as the ATM is booted. If the hardware and/or software components are not successfully verified, the TP may be operatively configured to prevent the computer of the ATM from booting into a fully functional state capable of operating transaction function devices. For example, the TPM may be used to verify that the BIOS or EFI of the computer motherboard has not been altered prior to booting an operating system. In addition, the TPM may be used to measure the nexus or other kernel or portion of an operating system, or other software component, before enabling the operating system or other software component to execute. In addition, the TPM may be used to verify that the one or more of the specific hardware components (e.g. hard drive, network controller, keyboard, display device) connected to the computer of the ATM have not been altered.

In an embodiment of the ATM, a measurement may include loading a portion of the operating system, other software component, or information read from a hardware device into secured curtained memory and sending an image of the memory to the TPM chip. The TPM chip may make a cryptographic hash of the image. This hash may be permanently and securely stored in the TPM chip or elsewhere for use in verifying that the operating system, other software components, or hardware components, have not been altered.

On subsequent boots of the ATM and/or execution of portions of the operating system or other software components, the TPM chip may again be used to measure the portions of the operating system and/or other software components being executed. Before placing the ATM into a fully functional state, the current measurements can be compared to the original or authorized measurements previously stored in the TPM chip or elsewhere to verify that the software configuration of the ATM has not been altered. With respect to the Microsoft NGSCB specification, the software being measured and verified using the TPM may include both trusted ATM components and other software components and applications which may or may not run on the nexus mode of the TP. In embodiments of the ATM, the TP may also be used to measure hardware configurations and hardware devices to verify that the ATM includes the correct hardware. Also, as will be discussed in more detail below, in further embodiments hardware devices in the ATM may be able to use the TP to authenticate software which controls the device prior to permitting the software to control the device. In addition, in embodiments in which a Microsoft operating system such as Microsoft Vista is loaded on the ATM, the previously discussed secure startup component 612 may use a TPM to verify portions of the hardware and/or software of the ATM have not been altered and/or to decrypt portions of the operating system or other software components prior to enabling the ATM to boot to a fully functional state.

Although, in the described embodiment, a measurement of a software component corresponds to at least one securely stored and/or digitally signed hash or other cryptographic function of the data which comprises the software component, in further embodiments a measurement of a software component may correspond to other data acquired from or responsive to a software component which may be used to authenticate the software component. For example, a software component may be grouped with other software components either by being located in a common location in a filing system or by being packaged as a group into a common file. The software components in such groups may be hashed and digitally signed as a group rather then individually. Therefore in alternative embodiments, a measurement may correspond to data usable to authenticate groups of software components.

Automated banking machines such as an ATM may be operative to perform cryptographic calculations involved with securely sending and receiving an ATM terminal master key, ATM communication keys, and user entered PINs or other information between the ATM and an ATM host banking system. Examples of ATM systems which use cryptographic calculations and protocols to securely transfer keys between an EPP of an ATM and a host banking system and which may be adapted to use a TP are shown in U.S. application Ser. No. 10/126,140 filed Apr. 19, 2002, which is hereby incorporated herein by reference in its entirety. In an embodiment of the ATM, one or more cryptographic calculations required by the EPP described in application Ser. No. 10/126,140 may be performed using the TPM of the TP.

For example, in an embodiment of the ATM, a service technician may initiate a function at the ATM or from a remote location which causes a trusted ATM component to send a request to a host banking system for a symmetrical key such as a terminal master key (also referred to as a key encrypting key) or other key. The request may include a digital certificate associated with the TP, TPM, trusted ATM component, and/or EPP. The host banking system may validate the certificate and use the public key associated with the certificate to encrypt a terminal master key. The host banking system may then send a message to the ATM which includes the encrypted symmetrical key. Once the message is received, the trusted ATM component may be used to decrypt the received key using a corresponding private key and an asymmetric cryptography algorithm such as RSA. The message from the host banking system with the received key may be digitally signed by the host banking system. The trusted ATM component may validate the received key through verification of the digital signature. In this described embodiment, the received key may be used by the ATM to decrypt further symmetrical keys such as communication keys (also referred to as a PIN encrypting keys) provided to the ATM by a host banking system. Such a received key or further keys may be used to encrypt data communicated between the ATM and the host banking system such as PINs inputted thorough a keypad of the ATM. In an embodiment of the ATM which includes an EPP, the trusted ATM component may securely send the received key such as a terminal master key to an EPP for use by the EPP to decrypt further keys such as a communication key provided to the EPP at a later time. The EPP may use the received key or further keys to encrypt PINs inputted into a keypad input device of the EPP by a user performing a transaction at the ATM. The encrypted PIN may then be sent to the host banking system for use in authorizing the transaction to be performed.

In a further alternative embodiment, the received key such as a terminal master key may be securely stored by a trusted ATM component in sealed storage on a data store of the ATM computer rather than sending the terminal master key to an EPP. The trusted ATM component may then retrieve the terminal master key from sealed storage for use with decrypting further keys such as communication keys provided to the ATM by the host banking system. The trusted ATM component may then securely transfer the decrypted communication key to the EPP.

In a further alternative embodiment, after the further key such as a communication key has been decrypted, the communication key may be securely stored by the trusted ATM component in sealed storage on a data store of the ATM rather then sending the communication key to an EPP. The trusted ATM component may then retrieve the communication key stored from sealed storage to encrypt PINs inputted into a protected input device other than an EPP prior to sending the PINs to the host banking system for authentication. Such protected input devices may correspond to a keypad, keyboard, touch screen of a display device, or any other protected input device of the ATM which conforms to the previously described secure I/O defined by the TP specification of the TP of the ATM. For example, in this described alternative embodiment, a protected key pad or touch screen may be operatively configured to securely communicate an inputted PIN to the computer and trusted ATM component by establishing a secure encrypted communication channel between the input device and TP and/or trusted ATM component.

In an embodiment of the ATM, a secure communication channel or a session may be established between a hardware device of the ATM and the computer of the ATM through use of the TPM. The session is created by securely communicating a session key between the computer in the ATM and the hardware device in the ATM. Data communicated between the computer and the hardware device may then be encrypted and decrypted using the session key. Such data may include operational data sent to or from the hardware device. For example, such operational data may include commands sent to the hardware device which are operative to cause the hardware device to perform a function. Such operational data may also include status messages regarding the operation of the hardware device which are sent to the computer.

Both the computer of the ATM and a processor in the hardware device may be adapted to perform a key transport mechanism protocol which provides unilateral key transport of the session key from the TPM to the hardware device. Such a protocol may correspond to the Key Transport Mechanism 4 of ISO.IEC 11770-3. In this described embodiment, the protocol may use an asymmetric encipherment system such as RSAES-OAEP and may use a asymmetric signature system such as RSA with the SHA-1 hash function. The size of the RSA modulus may be 2048 bits, for example. However, it is to be understood that in alternative embodiments, other cryptographic systems and configurations may be used to carry out the transport of a key between components in the ATM.

Figure 7:
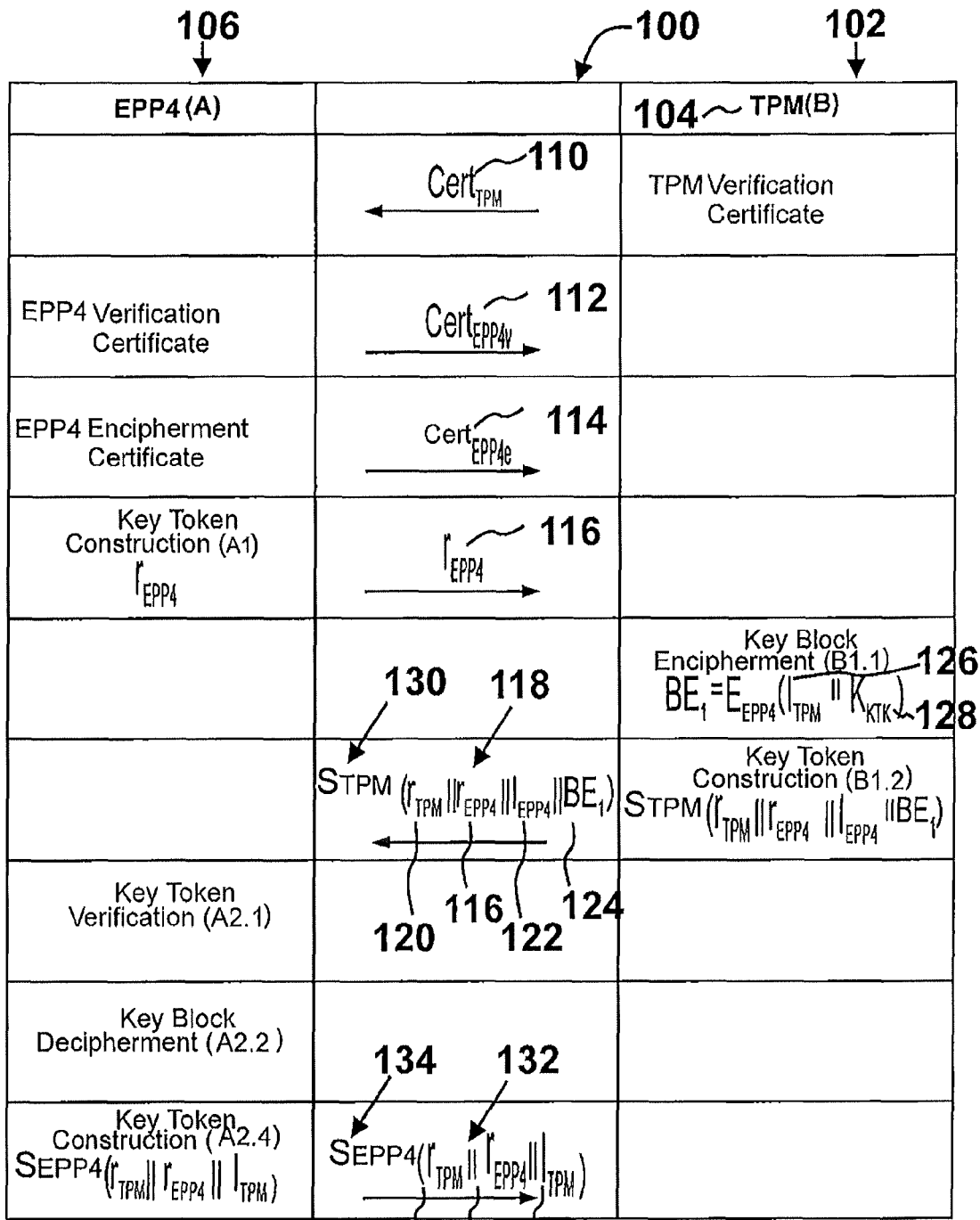
FIG. 7 is a schematic view showing a method for establishing secure communications between components of an automated banking machine.

FIG. 7 shows an schematic view of the protocol being carried out between a computer 102 of an ATM 100 with its associated TPM 104 and a hardware device such as an EPP 106 of the ATM. It is to be understood that in this described embodiment the computer uses the TPM to establish the secure connection with the EPP. As used herein, the term "using the TPM" corresponds to software operating in the computer which causes the computer to access functions of the TPM: for performing cryptographic functions on data such as signing data, for retrieving and/or storing data in a secure manner in the ATM, and/or for performing other TPM operations.

In this described embodiment, the computer 102 is operative to exchange digital certificates 110,112, 114 with the EPP 106. After the exchange, the computer has access to at least one public key of the EPP, and the EPP has access to at least one public key of the computer and/or TPM. In this described embodiment, the EPP and the computer and/or TPM may include more than one digital certificate, each of which are devoted to different operations. For example, the EPP may include a digital certificate 112 for use with verifying digital signatures generated by the EPP and may include a digital certificate 114 for use with encrypting messages being sent to the EPP. However, in alternative embodiments the EPP and the computer and/or TPM may include only one digital certificate for use with both encryption and verification operations.

In this described embodiment, the processor in the EPP is operative to generate and communicate a random number 116 to the computer. In response, the computer is operative to use the TPM to generate a message 118 which is signed with the private key of the TPM. The message includes: the random number of the EPP 116, a further random number 120 generated by the computer and/or TPM, a distinguishing identifier 122 associated with the EPP, and a key block 124 encrypted by the computer and/or TPM using the public key from the encipherment certificate 114 of the EPP. The key block 124 may comprise a distinguishing identifier 126 associated with the computer and/or TPM and the session key 128. In this described embodiments, the distinguishing identifiers for the EPP and computer and/or TPM may correspond to serial numbers or other unique numbers or names which can be used to identify the EPP and computer and/or TPM. In an embodiment of the ATM, such distinguishing identifiers may be included in the respective digital certificates 110, 112, and 114.

Upon receipt of the message 118, the processor in the EPP may be operative to: verify the signature of the TPM for the message 130 using the public key included in the certificate 110 of the TPM, verify that the distinguishing identifier of the EPP 122 matches corresponding data stored in the EPP, and verify the random number of the EPP 116 received in the message 118 matches the random number originally sent by the EPP. In response to these verifications, the processor of the EPP is operative to decrypt the key block 124 included in the message 118 to produce the session key 128 and the distinguishing identifier 126 of the computer and/or TPM. The processor may also verify that the distinguishing identifier 126 corresponds to the expected identity of the computer and/or TPM. Once these verifications have been performed, the processor of the EPP is operative to accept the session key 128 and store it in a data store of the EPP.

The processor of the EPP is further operative to construct and communicate to the computer a further message 132 which is signed by the processor of the EPP using a private key associated with the public verification key included in its verification certificate 112. The further message may include the random numbers 116, 120 and the distinguishing identifier 126 associated with the computer and/or TPM.

Upon receipt of the further message 132, the computer is operative to use the TPM to verify the signature 134 of the EPP using the public verification key included in the verification certificate 112 of the EPP. In addition the computer may be operative to verify that the random numbers 116, 120 match the random numbers sent in the message 118. Also, the computer may be operative to verify that the distinguishing identifier 126 matches the corresponding identify information associated with the computer and/or TPM. Once these verifications have been performed, the computer is operative to begin using the session key 128 to encrypt and decrypt information sent to and from the EPP.

The above-described method and system for establishing a secure communication session between the computer in the ATM and the EPP may be performed with other hardware devices such as input devices, output devices, and other transaction function devices such as a cash dispenser, card reader, and depository.

With respect to the EPP, all inputs provided through operation of the keypad of the EPP may be encrypted with the session key and communicated to the computer for use with carrying out transactions with the ATM. Such encrypted inputs may include individual key strokes of the numbered keys of the keypad which may correspond to an amount of value to dispense, an amount of value to deposit, an amount of value to transfer, or other numerical information needed to perform transaction functions with the ATM. In addition, such encrypted inputs may correspond to individual key strokes of non-numeric keys (e.g. "cancel" and "enter" keys) of the keypad. Also, encrypted inputs corresponding to numeric keys, and/or non-numeric keys may be used to control or select one of a plurality of menu options of a user interface displayed through a display device of the ATM. The selection of such menu options may cause the ATM to progress through the steps involved with carrying out a transaction function (e.g. dispensing cash) or other operations such as servicing the machine.

In embodiments of the ATM, software operating in the EPP may be operative to send operational messages such as command messages encrypted with the session key to the EPP, which messages cause the EPP to perform an operation. For example, the EPP may be responsive to an encrypted command message sent from the computer to place the EPP in a secure mode for entering a PIN. In this secure mode, the EPP may store a sequence of key presses which correspond to the input of a PIN. For each key stroke the EPP may send an encrypted message to the computer of the ATM which notifies the ATM that a key has been pressed but does not include the actual value of the key being pressed. Software operating in the computer of the ATM may be responsive to these messages to display a star or asterisks symbol through a display device of the ATM which corresponds to each input into the EPP.

Upon entry of the PIN, the user may provide an input through a function key, a touch screen or an ENTER key on the keypad of the EPP which causes the computer to send a further command message to the EPP which places the EPP out of the secure mode. Upon receipt of this further command message, the EPP may encrypt the stored PIN with a symmetrical key such as a communication key and send the encrypted PIN key to the computer in a message encrypted with the session key. The computer may use the TPM to decrypt the message using the session key. The resulting encrypted PIN may then be communicated to a host banking system. The host banking system also has access to the communication key and is operative to decrypt the PIN for use with authorizing a transaction being performed with the ATM such as a cash dispensing transaction.

In embodiments of an ATM which include a TPM, the TPM may be used to establish an encrypted communication session with a remote server such as a host banking system. Such an encrypted communication session may be formed by carrying out a secure sockets layer (SSL) protocol, a transport layer security (TLS) protocol, a virtual private network (VPN) protocol or any other protocol which may use client side (e.g. ATM) side authentication. Examples of ATMs which use SSL to communicate with remote servers are shown in U.S. application Ser. No. 10/990,334 filed Nov. 16, 2004, which is hereby incorporated herein by reference. In this described embodiment, the computer in the ATM may use the TPM to securely store a key in an encrypted form either in the TPM or in an encrypted file stored elsewhere in the ATM. For an SSL or TLS protocol, the key stored using the TPM may include a private RSA key or other asymmetric key. The ATM may include a software component capable of causing the TPM to generate the private key and a corresponding public key for use with the asymmetric algorithm performed during the SSL or TLS protocol. The software may further cause a certificate request message to be generated and sent to a remote certificate authority for use in generating a digital certificate which includes the public key of the ATM. The software may be capable of receiving the digital certificate and storing it in the ATM for later use during the SSL or TLS protocol.

When a SSL or TLS connection is being formed by the at least one computer in the ATM with a remote server, software operating in the computer of the ATM may forward the digital certificate of the ATM to the remote server. The software may also access the TPM to cause data involved with establishing the SSL or TLS connection to be encrypted using the private key of the ATM. In this described embodiment, the software used for establishing the SSL or TLS connection may include a browser that is adapted to retrieve the private key using the TPM of the ATM. For an embodiment which establishes a VPN, a VPN client software application may be used which is adapted to retrieve the private key from the TPM of the ATM.

In a further embodiment of an ATM, the TPM may be used to establish an encrypted communication session between the computer of the ATM and hardware devices of the ATM using the SSL or TLS protocols. In this described embodiment, the hardware devices may be operative to use a network protocol such as TC/IP to communicate with the computer of the ATM. The physical connection between the devices and the ATM may include a USB connection, ethernet connection, or any other physical connection that is operative to permit network communication such as TCP/IP. Examples of ATMs which include an internal network for connecting ATM devices to a computer in the ATM are shown in U.S. application Ser. No. 09/505,594 filed Feb. 16, 2000, which is hereby incorporated herein by reference. In this described embodiment, the ATM devices may include respective client side digital certificates for use with establishing an SSL or TLS connection with the computer of the ATM.

As discussed previously, in an embodiment of an ATM, the TPM may be used to measure and verify that hardware devices and/or software of the ATM have not been altered, prior to enabling the ATM to perform transaction functions using the hardware devices and software. For example, the TPM may be used to measure and verify that valid transaction function devices are installed and/or have not been altered in the ATM, such as a cash dispenser and depository mechanism. The TPM may also be used to measure and verify that other types of hardware devices of the ATM are valid and/or have not been altered such a card reader device, display screen, function keys, keypads, network card, hard drives, CD readers, DVD readers or any other device that may be included in an ATM. In addition or alternatively, the TPM may be used to measure and verify software components used to control the hardware devices of the ATM have not been altered. Examples of such software devices which may be measured and verified using the TPM may include operating system files, device drivers, configuration files, service providers, databases, XFS layers, ODS layers, TEC components, browser software, JVMs, terminal control software components, diagnostic software applications, server applications, service and maintenance software applications or any other software components including software files and data that may be included in an ATM. In addition, the TPM may be used to measure and verify that the BIOS or EFI of the computer of the ATM has not been altered.

In an embodiment of an ATM, devices in the ATM such as transaction function devices may be adapted to authenticate the particular software stack which controls and/or receives data from the devices. For example, a cash dispenser may be adapted to challenge the integrity of the operating system state prior to dispensing cash in response to commands received from the software stack which controls the cash dispenser. Only when approved software is confirmed as executing in the computer of the ATM will the device operate in response to commands from the software and/or will send operational data to the software. In this embodiment, the TPM is used to measure the current software stack. The current measurements are sent to the device which issued the challenge. A processor in the device may then compare the current measurements to approved reference measurements of the software stack previously stored in the device before allowing the device to operate.

The following is a description of an embodiment of the ATM in which the cash dispenser is adapted to verify a software stack associated with operating the cash dispenser. However, it is to be understood that in alternative embodiments other transaction functions devices in the ATM such as a card reader, depositor, EPP, and other devices including input and output devices of the ATM may be adapted to very software associated with the device.

In this described embodiment, the ATM may include authentication software operating in the computer of the ATM which is operative to enable a user to select which software components comprise a software stack to be validated by the cash dispenser. The software components that may be selected, for example, may include device drivers, service providers, module interfaces, XFS software, application libraries, terminal control software, diagnostic software, or any other software operative to control the operation of or communicate with the cash dispenser. In this described embodiment, these software components may be adapted to be locked so as to limit access to themselves to only other components that comprise the selected software stack. As a result, when the device driver is locked, the device driver will only enable one of the other software components in the selected stack to access device driver functions of the device driver and will not permit software components not included in the stack (e.g. a virus) to access the device driver functions.

In an embodiment of the ATM, the authentication software may cause the TPM to generate reference measurements for each of the selected components which comprise the software stack upon execution of the components by the computer of the ATM. Each reference measurement may include a hash (e.g. digest) of the software component which is digitally signed using the TPM. The authentication software may then send the generated reference measurements to the cash dispenser for storage therein.

In an embodiment of the ATM, the authentication software may only be operative to update the cash dispenser with a set of reference measurements at times when the operator performing the configuration of the ATM is verified as having sufficient permissions to do so. Such a verification may be performed by adapting the software and/or the cash dispenser to only permit updating of the reference measurements when the door of the chest of the ATM is open. In an embodiment of the ATM, inside the chest, the ATM may include an input device such as a switch or button which when actuated by the user is operative to cause and/or permit the software to update the cash dispenser with updated reference measurements of the selected software stack.

Figure 8:
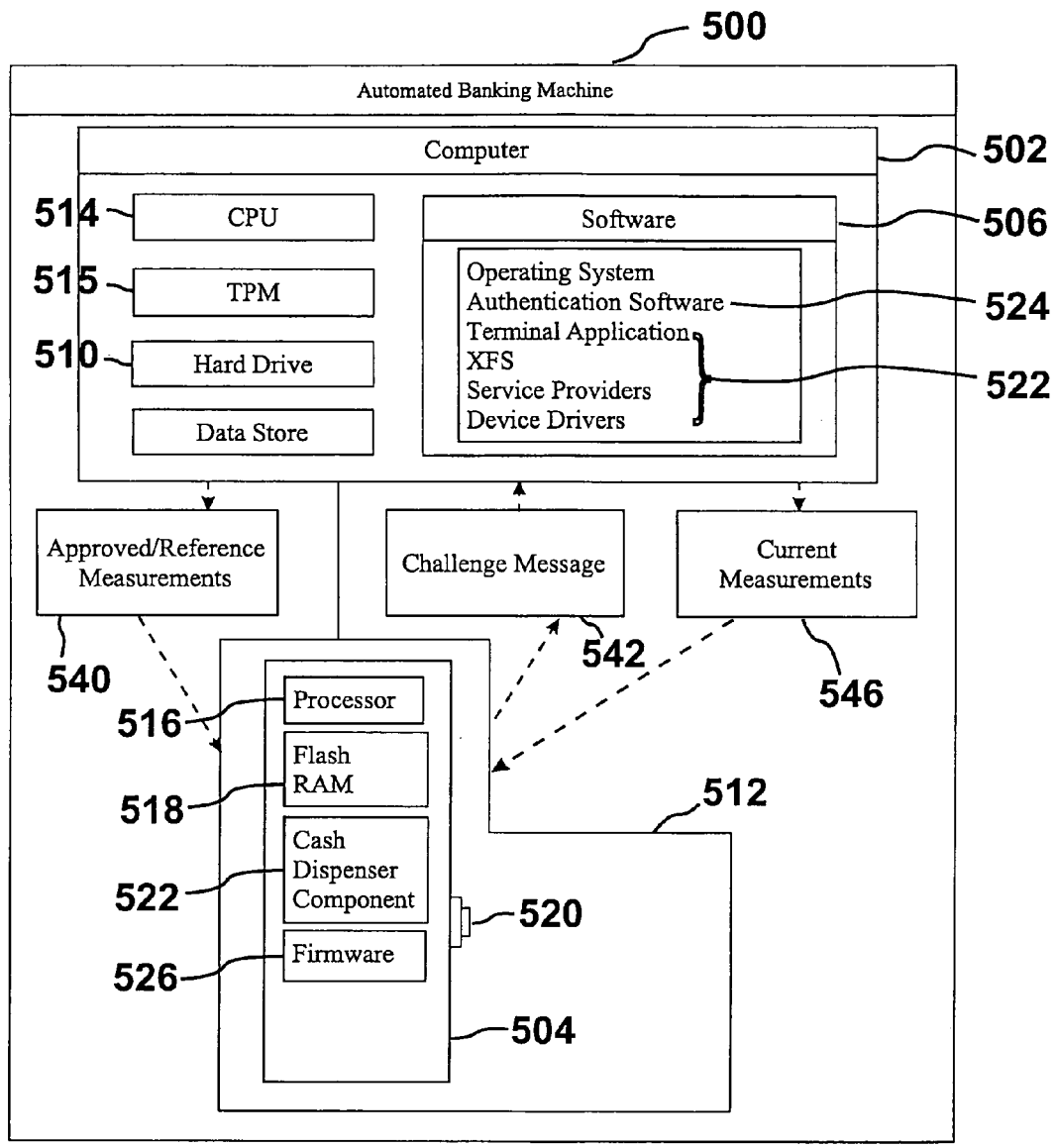
FIG. 8 is a schematic view showing a system and method of a transaction function device such as a cash dispenser operating to authenticate software operative to control the cash dispenser.

FIG. 8 shows a schematic view of an ATM 500 which includes a computer 502, in operative connection with a transaction function device which corresponds to a cash dispenser 504. Here the cash dispenser is located inside a chest or safe 512. The described button or switch 520 is also located inside the chest 512. In this described embodiment the computer includes at least one processor 514, a TPM 515, and a hard drive 510, or other storage device operative to store a plurality of software components 506 including the selected software stack 522 associated with the cash dispenser and the described authorization software adapted to enable the cash dispenser to verify the software stack. The cash dispenser includes a processor 516, firmware 526, a data store such as a nonvolatile memory device 518, and associated cash dispenser hardware 522 for storing and dispensing cash.

In an embodiment of the ATM, the input device 520 may be in operative connection with the cash dispenser, and when manipulated by a user may be operative to place the cash dispenser in a mode that is operative to accept new approved reference measurements 540 sent by the authentication software application 524. Acceptance of the reference measurements may include storing the reference measurements in the memory device 518 and deleting any previously approved reference measurements therefrom. The authentication software may also send the cash dispenser a digital certificate associated with the TPM. In this described embodiment, the cash dispenser may be manufactured to include the digital certificate of the certificate authority which signed the digital certificate of the TPM so that the processor of the cash dispenser is operative to authenticate the digital certificate of the TPM.

Each time the cash dispenser software stack 522 is initially started in the computer of the ATM, the TPM may be used to measure the software which comprises the stack 522. Such measurements may be stored in the platform configuration registers within the TPM or in an encrypted file on the hard drive thorough operation of the TPM.

As part of a cash dispenser initialization routine, the cash dispenser may be operative to send a challenge message 542 to the computer to determine if the approved software stack is running in the computer. The challenge message may include a random number generated by the processor 516 in the cash dispenser. In this described embodiment, a cash dispenser device driver or other software operating in the computer 502 may be responsive to the challenge message to cause the TPM to append the random number to each of the current measurements of the software stack and to digitally sign the combination of each measurement and random number with the private key of the TPM. Each digitally signed measurement/random number 546 may then be returned by the device driver or other software to the cash dispenser 504.

The processor 516 of the cash dispenser may verify the digital signatures of the current measurements using the public key from the digital certificate of the TPM. In addition, the processor 516 of the cash dispenser may verify that the random number included with each current measurement matches the random number sent in the challenge message 542. In addition, the processor 516 of the cash dispenser may compare the current measurement hash values to the approved reference hash values stored previously in the data store of the cash dispenser. If the measurements match, the cash dispenser is placed in a mode which allows dispensing. If the values do not match, the processor is operative to send a fault message to the computer indicative of the current software stack not matching an approved software stack for operating the cash dispenser.

In the described embodiment, each time software included in the cash dispenser software stack is upgraded or otherwise modified, the authentication software may be operated by a user to update the approved reference measurements stored in the cash dispenser. Such approved reference measurements may be acquired by the authentication software by using measurements of the software as generated using the TPM. However, in an alternative embodiment, the approved reference measurements may be generated remotely from the ATM and sent to the ATM for storage in the cash dispenser.

The installation routine for installing the updated software may include using the authentication software previously described to transfer the remotely generated approved reference measurements for the software components to the cash dispenser from a remote server However, in a further embodiment, the remotely generated approved reference measurements may be included with the installation software or packages associated with the software components. When the installation software is used to install the software components on the ATM, the installation software may also install the remotely generated approved reference measurements for the software components in the ATM.

After the input device 520 within the chest has been operated by a user, the authentication software may then send the remotely generated approved reference measurements to the cash dispenser for storage therein. The cash dispenser may have been manufactured or otherwise configured to include in the data store 518 the public key of the entity which signed the approved reference measurements. The processor in the cash dispenser may then use the public key to verify the signatures of the approved reference measurements prior to enabling the cash dispenser to use the approved reference measurements to authenticate cash dispensing software components.

Embodiments of an ATM may include a mechanism for authenticating users operative to service the ATM through use of a portable storage device placed in operative communication with the ATM. Such a mechanism may be adapted for use with both ATMs which include a TPM and ATMs which do not include a TPM. As shown in FIG. 2, the ATM may include a communication device 60 which is operative to communicate with a portable storage device 62 of a user. Such a communication device 60 may comprise a hardware port such as a USB port adapted to communicate with a portable storage device 62 such as a portable USB device. In alternative embodiments, the communication device of the ATM may correspond to a wireless communication transmitter/receiver (e.g. Bluetooth®, IR, IEEE 802.11) adapted to communicate wirelessly with a portable storage device placed within several feet of the ATM.

In this described embodiment, the computer of the ATM includes an operating system with at least one login account. The login account may correspond to an administrative account or other account which has sufficient permission to execute software components operative to configure and/or service the ATM. The login account requires an account password to successfully log into the account. In this described embodiment, the account password may be different for each ATM in which this described authentication mechanism is employed.

The portable storage device may include stored therein an encrypted first portion of the account password. The ATM may include a login software component operative in the computer of the ATM which is operative to cause the computer to produce a decrypted first portion of the account password through communication with the portable storage device. The login software component may further cause the computer to access a second portion of the account password from a data store in the ATM. Such a data store may correspond to the operating system registry or some other data store located in the machine.

The login software component is operative to cause the computer to generate the full account password responsive to the first portion and the second portion and is operative to cause the computer to log into the login account of the operating system using the generated account password.

For a USB device or other portable storage device which requires a physical connection with a communication port of the ATM, the login software component may be operative to perform one or more of these described functions upon detection of the portable storage device being placed in the port. For example, upon detection of the portable storage device being connected to the port, an event or function of the login software may be triggered which causes the login software to output a prompt through an output device for the user to enter his/her PIN associated with the portable storage device. In addition, the login software component may be operative to automatically log out the login account responsive to the detection of the portable storage device being removed from the port.

In an ATM which includes a TPM, the portable storage device may correspond to a flash memory device such as a SanDisk® 128 Megabyte flash drive or other USB nonvolatile memory storage device. After the service user inserts the flash drive into the communication port of the computer of the ATM, the login software component may be adapted to prompt the user to enter through an input device of the ATM a password such as a PIN which is associated with the flash drive. As shown in FIG. 9, the login software component 204 may also be operative to retrieve a credential 202 stored on the flash drive 200. In an embodiment of the ATM, the operating system may be adapted to automatically mount the flash drive in association with a file system drive letter or directory. The login software component may be operative to retrieve the credential by accessing the drive letter or directory corresponding to the newly mounted flash drive.

In this described embodiment, the credential may include identity data associated with the user and/or the flash drive which is appended to a hash of the PIN which is associated with the flash drive. The credential may be digitally signed by a certificate authority trusted by the ATM. The login software component is operative to verify the signature on the credential using a public key associated with the certificate authority which signed the credential 202. In an embodiment of the ATM, the digital certificate of the certificate authority which includes the public key may be stored in a data store of the ATM.

In this described embodiment, the login software component is operative to calculate a hash of the inputted PIN and compare this calculated hash to the hash of the PIN included in the credential. Responsive to the hashes being confirmed as matching, the login software may automatically log the user into the login account of the ATM or may present the user with a selectable menu option which when selected by the user using an input device of the ATM is operative to cause the login device to log into the login account.

In this described embodiment, the flash drive may further include stored therein an encrypted first portion of the account password. As shown in FIG. 9, the login software component may be operative to retrieve the encrypted first portion 206 of the account password from the flash drive and use the PIN and the TPM to decrypt it. To accomplish the decryption, the login software component may be operative to generate a symmetrical key from the PIN. The generated symmetrical key may be used by the login software component to decrypt the encrypted first portion of the account password to produce an intermediately encrypted first portion of the account password. Next the login software may be operative to use the TPM to decrypt the intermediately encrypted first portion of the account password to produce the decrypted first portion of the account password. In this embodiment, the TPM may be operative to access a further symmetrical key stored using the TPM which is used by the TPM and/or the login software to decrypt the intermediately encrypted first portion of the account.

As discussed previously, the login software is operative to retrieve the second portion of the account password from a data store of the ATM such as a registry of the operating system. The login software may then combine the fully decrypted first portion of the account password with the second portion of the account password to produce a password capable of being used to log into the login account.

The identical first portion of the account password may be used with respect to a plurality of ATMs. However, the second portion of the account password may be randomly generated for each ATM. As a result, the combination of the first portion and the second portion will produce a unique password for logging into the login account of each respective ATM.

The previously described portable storage device (e.g. USB flash drive) may be used to log into an ATM which includes a TPM. However, in an alternative embodiment, a portable storage device which includes a processor and an encrypted data store may be used to log into an ATM which does not include a TPM. Such a device may correspond to a USB cryptographic token device which only permits access to its encrypted data responsive to the processor on the device receiving a proper password or PIN from the ATM or otherwise authenticates the ATM.

In this alternative embodiment, the data stored in the encrypted storage may include the first portion of the ATM account password. Rather than using the inputted PIN to form a symmetrical key used to decrypt the first portion of the account password as described previously, the login software component may communicate the PIN to the cryptographic token device. As shown in FIG. 10, the processor of the cryptographic token device 220 may authenticate the PIN and forward a digital certificate 222 associated with the cryptographic token device to the login software component 224. The login software component may verify the digital certificate using a public key associated with the trusted certificate authority which signed the certificate of the cryptographic token device.

Once the certificate of the cryptographic token device has been authenticated, the login software component may generate and send a random number 226 to the cryptographic token device. In response, the processor of cryptographic token device may sign the received random number with a private key and send the signed random number 228 to the login software component.

The login software component may be operative to verify the signature of the random number using the public key from the certificate of the cryptographic token device. The login software may further be operative to verify that the random number signed by the cryptographic token device matches the random number sent by the login software component.

Once the signed random number is authenticated, the login software may automatically begin the process of logging into the login account or may prompt the user to select a menu option before proceeding to log into the login account. The process of logging into the login account may include the login software component causing the processor of the cryptographic token device to decrypt the first portion of the account password and forward the first portion of the account password 230 to the login software application. The login software application may then combine the first portion retrieved from the cryptographic token device with the second portion of the account password stored in the machine to produce the full account password. The full account password may then be used by the login software application to log into the login account.

In these described embodiments of either the flash drive or the cryptographic token, when the ATM is being manufactured, serviced, or otherwise configured to have the login account operative to service the ATM, the account password may be initially set for the account password through use of the portable storage device. For example, the login software component or another software component may be operative to randomly generate the second portion of the account password and store the second portion in a data store of the ATM such as the registry of a Microsoft® operating system. In addition, the login software may acquire the first portion of the account password from a portable storage device as discussed previously and concatenate or otherwise combine it with the randomly generated second portion of the account password. The login software may then create an administrative or other type of account with sufficient permission to service the ATM and set the password for the account to the full account password generated from the first and second portions of the account password.

In this described embodiment, the login software component or another software component operative to generate the ATM account password, may be used to change the password for the login account as well. This may be accomplished by a user selecting a menu option of the computer which is operative to cause the login software component to generate the ATM account password as discussed above using a newly generated random second portion of the account password. The login account may then be updated to have the newly generated account password.

In a further embodiment, the login software may be operative to update the password automatically each time a user logs into the ATM. For example, when a user inserts his/her portable storage device, enters his/her PIN, and logs into the login account using the login software component, the login software component may be further operative to: generate a new second portion of the account password, save the second portion in the data store of the ATM, combine the first portion of the account password retrieved from the portable storage device with the newly generated second portion to form a new account password, and update the login account to have the new account password.

As described previously, the credential stored on the flash drive may include identity information. Also, the digital certificate of the cartographic token device may also include identity information. Such identity information may be uniquely associated with the device and or the user which has been issued the portable storage device. The ATM may include at least one listing of identity information for credentials and/or certificates stored in a data store of the ATM. The at least one listing may correspond to a list of authorized credentials/certificates ("white list") and/or a list of revoked credentials/certificates ("black list"). The ATM may be responsive to a listing of authorized credentials/certificates to only permit portable storage devices with credentials/certificates corresponding to identity information include in the listing to have authorization to log into the ATM using the login software component. Portable storage devices which do not have credentials/certificates with identity data in the listing will not be permitted by the login software component to log into the ATM. In the same embodiment or in an alternative embodiment the ATM may be responsive to a listing of revoked credentials/certificates to prevent portable storage devices with credentials/certificates that have identity information in the listing to have authorization to log into the ATM using the login software component.

In these described embodiments, the listing(s) of authorized and/or revoked credentials/certificates may be updated at each ATM remotely by downloading the listing(s) from a remote server. In further embodiments the listing(s) of authorized and/or revoked credentials/certificates may be stored on a portable storage device of an authorized user. When such a portable storage device is used to successfully login into an ATM a copy of the listing(s) may be copied to the ATM for storage therein. The listing(s) may be digitally signed by a certificate authority trusted by the ATM. Such a certificate authority may be the same certificate authority which signed the credential/certificate. The ATM may be operative to authenticate the digital signature on the listing(s) prior to accepting the listing for use with authorizing or permitting portable storage devices to be used to log into the ATM.

In embodiments where the ATM includes legacy components which may operate in the standard mode or standard partition and/or were not designed for use with a TPM, the TP may be used to minimize the security risks such legacy components may pose to the ATM. For example, ATMs may include an XFS layer which by itself may have limited functionality for securely controlling devices of the ATM. A TP may be used to measure and verify both the XFS layer and components that receive and send communications through an XFS layer of an ATM. Examples of an ATM system which is operative to establish secure communications between components of an XFS enabled ATM and which may be adapted to use a TP to establish such secure communications are shown in U.S. application Ser. No. 10/722,065 filed Nov. 24, 2003, which is incorporated herein by reference in its entirety.

For example, XFS enabled ATMs may include application layer components. Such application layer components may be operative to control XFS compatible hardware devices through communication with an XFS layer. In this described embodiment the application layer components above the XFS layer may correspond to trusted ATM components. In addition, one or more of the device driver layer components or other software interfaces between the XFS layer and the hardware components may also be trusted ATM components. Examples of device driver layer components include device drivers, XFS service providers, and module interfaces such as unified base release (UBR) components or the Diebold Agilis module interface (AMI).

In an embodiment of the ATM, to make communications with the XFS layer more secure, the device driver layer components may only be responsive to control hardware devices when the communication received from the XFS layer has been confirmed to originate from a trusted ATM component. In this embodiment, a security component of the ATM may be operative to supply this confirmation to the device driver layer components. For example, each time an application layer component communicates through the XFS layer, the application layer component may also notify the security manager component. The security manager component may then confirm to a device driver layer component that the communication received through the XFS layer originated from an authorized trusted ATM component. In this described embodiment, the application layer components, device driver layer components, and the security manager may use the attestation features of the TP to prove their identities to each other and to establish secure communication between them.

For example, a first application layer component may send a first communication to a security manager component of the ATM. The first communication may be attested to through use of the TP to enable the security manager component to authenticate the first communication. The application layer component may then send a second communication through the XFS layer of the ATM which is directed to the device driver layer of the ATM. In this described embodiment, the device driver layer may cause a hardware device of the ATM to operate responsive to both the second communication and the security manager.

In this described embodiment, the device driver layer may communicate with the security manager to verify that it may operate the hardware device responsive to the second communication. The communications from the security manager may be attested to through use of the TP to enable the device driver layer component to authenticate communications from the security manager.

In addition to using the TP to authenticate communications passed through an XFS layer or other software stack of the ATM, the TP may also be used to measure and verify that the software stack that corresponds to the components of the XFS layer, application layer and device driver layer or other software stack of the ATM are valid and have not been changed to an unauthorized configuration.

The ATM may include service software operative to manage changes to the TP and the trusted ATM applications. The service software may modify the authorized states of the ATM that are measured and/or verified by the TP. The service software may enable different portions of the ATM to be configured based on the type of user performing the task. For example, an administrative user may be permitted to update the TP to trust new hardware and/or software installed on the ATM, while a maintenance user may be limited to updating a specific subset of the software and/or hardware configurations to be trusted by the TP. In embodiments of the ATM, the TP may also be used to maintain an audit trail of all changes to the configuration of the ATM. Audit trail logs for operations of the TP and hardware and software components of the ATM may be securely stored in sealed storage on a data store of the ATM.

In embodiments of the ATM, the service software may be operative to specify which SPs, device drivers, application or other ATM components are trusted and enabled to operate in the nexus mode or protected partition of the ATM TP as trusted ATM components. The ATM may include a user interface which enables an authorized user to grant individually or as a group, potential trusted ATM components permission to operate using the TP. Each trusted ATM component may include a manifest which includes a hash of the code of the program(s) or a public key(s) usable to verify digital signatures of the code of the program(s). The TP may be operative to authenticate each trusted ATM component using the information in the manifest. The manifest in turn may include a digital signature which can be authenticated by the TP to enable the trusted ATM component to operate in the ATM.

In addition to including software which specifies which applications installed on the ATM are trusted by and/or are granted permission to use the TP of the ATM, the ATM may include configuration applications which are operative to update the ATM with new authorized software configurations of the ATM responsive to a license or other accessed or inputted set of rules. Examples of an ATM platform which is operative to authorize the installation and/or configuration of software on the ATM and which may be adapted to use a TP to authenticate an installation and/or configuration of an ATM are shown in U.S. application Ser. Nos. 10/732,204 filed Dec. 9, 2003 and 09/957,982 filed Sep. 21, 2001, which are incorporated herein by reference in their entirety. In embodiments of the ATM, license information for software being installed on an ATM may be securely stored in sealed storage in a data store of the ATM.

Examples of license information which may be securely stored in sealed storage may include: configuration rules for software applications and hardware devices of the ATM, software application expiration dates, the name of the customer, or entity licensing the software, serial numbers for the software application, version numbers for the software applications, authorization keys for the software applications, software IDs, hardware IDs, or any other information which is associated with the ATM. Each time an ATM is booted and/or an application of the ATM is started in the ATM, the license information may be retrieved from sealed storage and compared to the state of the ATM as measured using the TP of the ATM. If the current measured state of the ATM does not correspond to the license information, the TP and/or ATM software may be operative to prevent the ATM from booting, and/or prevent the ATM software from running in an enabled state.

The process of installing the new software may include granting any new or updated trusted ATM components with permission to use and/or be trusted by the TP. For example, trusted ATM components may be granted permission to operate in the nexus mode or protected partition of the ATM TP. Also the TP may be updated to include authorized measurements for the newly installed software.

The TPM may include a digital certificate signed by the manufacture or supplier of the TPM or computer motherboard. The TP may also be used to acquire additional digital certificates for the ATM. Such additional certificates may be issued or signed by a specific certificate authority that is trusted by one or more trusted ATM components of the ATM. In an embodiment of the ATM, the trusted ATM components may require the ATM to be issued one or more digital certificates from the specific certificate authority prior to becoming fully functional on the ATM. In addition, systems remote from the ATM such as a host banking system, financial transaction server, or other server, may also require the ATM to be issued one or more digital certificates from a specific certificate authority prior to performing functions with the ATM.

For example, a trusted ATM component of the ATM may include a device driver such as a service provider (SP) or other component which controls the operation of a cash dispenser. Such a cash dispenser device driver may only be operative to cause the cash dispenser to dispense cash, after the cash dispenser device driver has verified that the TP has possession of a particular private key. Such a private key may corresponds to a public key named in a digital certificate issued by a specific certificate authority that is trusted by the cash dispenser device driver. In an embodiment of the ATM, communications received by the cash dispenser device driver may be digitally signed or attested to by the TP using the private key. If the public key associated with the digital certificate issued by the specific certificate authority is usable to verify the digitally signed or attested to communication, then the cash dispenser device driver may become operative to operate the cash dispenser in the ATM.

Although in this example a device driver has been described as being operative to authenticate the TP, it is to be understood that in other embodiments of the ATM other trusted ATM components may be operative to make this verification before enabling device drivers to operate hardware devices. For example, in addition to service providers, the device driver layer of the ATM may include a module interface layer such as a UBR or an AMI which provides an additional layer of abstraction between the service providers and the hardware devices. One or more of the service providers may be programmed to control hardware devices through communication with the module interface components rather than directly communicating with one or more hardware devices. In this described embodiment, the module interface may be adapted to authenticate the TP before enabling one or more SPs to operate their respective hardware devices.

In further embodiments, the hardware devices themselves may only permit a function to be performed after the hardware device has verified that the TP has possession of a particular private key. Such a private key may correspond to a public key named in a digital certificate issued by a specific certificate authority that is trusted by the hardware device. Such a public key may be stored in the hardware device. In this described embodiment, communications received by the hardware device may be digitally signed or attested to by the TP and/or a device driver or other ATM component using the private key. A processor in the hardware device may then authenticate the digital signature associated with communication using the public key. If the hardware device is able to verify the digitally signed or attested to communication, then the hardware device may become operative to perform a function in response to the communication.

In an embodiment of the ATM, service software operating in the computer of the ATM may be operative to install and manage digital certificates used in the operation of the TP. Examples of digital certificates that may be managed on the ATM by the service software for one or more of the previously described TP specifications may include: validation certificate, TPM endorsement certificate, TPM identity certificate, conformance certificate, and/or platform certificate. The validation certificate may include data that includes TPM validation data statements and labeling. The endorsement certificate may be used to vouch for the existence of a particular TPM. The TPM identity certificate may include a public key for a TPM identity and a description of the TPM and/or TP. The conformance certificate may be issued by an entity chosen by the manufacture of the TP to vouch for the platform meeting the requirements of the specification for the ATM. A platform certificate may attest that the ATM TP platform has been built according to the manufacture of the ATM.

In embodiments of the ATM, service software installed on the ATM may include ownership management functions for managing a transition in ownership of the ATM: from the manufacture of the ATM to the entity responsible for installation of the ATM, to the institution or entity that operates the ATM, and to the entity that is responsible for maintenance of the ATM. The service software may be operative to manage in a trusted manner the identities and status settings for the TP as the ATM transitions from one entity to another.

The service software of the ATM may also be operative to perform secure backup and recovery functions of information stored on the TPM chip and/or encrypted files stored in the protected partition or in other sealed storage managed by the TP. Such backups of information managed by the TP may also be securely stored on a system remote from the ATM in an encrypted form which can not be deciphered by the remote system. The service software of the ATM may also be operative to securely migrate selected information managed by a TP of an ATM to a TP of a trusted platform to support maintenance of the ATM.

In embodiments where the cryptographic functions on the TPM chip are not sufficient for the cryptography requirements of the ATM, the TP may be operative to securely manage cryptographic calculations using protected cryptographic software and/or hardware components 332 which are external to the TPM. Such external cryptographic components 322 may include cryptography calculations performed by the CPU(s) of the computer of the ATM responsive to the TPM, nexus, TSS, a cryptography API of the operating system, and/or a trusted ATM component.

ATMs may be manufactured using a motherboard in which ownership of the TPM has not yet been established. Either during or after the manufacturing of the ATM, ownership of the TPM may be established by installing and executing service software including TPM configuration software associated with the TPM on a hard drive of the ATM. In one exemplary embodiment, the TPM configuration software may include a TPM driver, a Trusted Software Stack (TSS), cryptography service provider software, and/or any other TPM software operative to configure a TPM and acquire certificates associated with RSA keys generated and/or stored using a TPM. In an exemplary embodiment the hard drive of the ATM may be partitioned to have at least two partitions. The TPM configuration software may be installed on one of the partitions and the ATM applications that run during normal ATM operation for a customer may be installed on a second one of the partitions. In one embodiment, after the TPM configuration software has been used to configure the TPM, the TPM configuration software may be deleted from the first partition or otherwise removed from the hard drive of the ATM.

For a TPM 1.2 compliant TPM, the TPM configuration software may be operative to take ownership of the ATM by establishing a password for the TPM. During the process of establishing ownership of the TPM, the TPM may produce a number of RSA public and private keys including Storage Root Keys and Endorsement keys. The TPM configuration software may also be operative to cause the TPM to generate further RSA keys such as signature keys.

The TPM configuration software may facilitate generating certificate request messages (e.g. PKCS#10 certificate request) including for example the signature public keys generated using the TPM. The TPM configuration software may also facilitate communicating the certificate request messages to a Certificate Authority through a network in operative connection with the ATM. The TPM configuration software may also facilitate receiving the requested certificates from the Certificate Authority and storing the received certificates in the ATM such as on the second hard drive partition.

In an exemplary embodiment, the signature private key may be used by the TPM to sign data (e.g. the message (118) shown in FIG. 7) usable to establish secure communications between a computer in the ATM and a hardware device connected to the computer of the ATM such as an EPP, cash dispenser or other device. Also, as described previously, the corresponding certificates may be communicated to the hardware devices for use by processors in the hardware devices to authenticate the digital signatures generated using the TPM.

The TPM configuration software may also be used to securely forward data associated with the configuration of the TPM to a remote backup database for later use in recovering the ATM after a hard drive failure or other event which destroys data stored on the ATM usable to interface with the TPM. Such backup data may include certificates, keys, and/or the owner password associated with the TPM.

For ATMs that may not be connected to a network in operative connection with a Certificate Authority or a backup database, the TPM configuration software may be operative to store and/or retrieve certificate request messages, returned certificates, and/or TPM backup data on/from portable storage devices (e.g. USB drives, CDs, DVDs) accessible by a technician operating the TPM configuration software. The technician may then move the portable storage device between the ATM and a further computer connected to a certificate authority or backup database through a network to facilitate acquiring certificates and/or storing/restoring TPM data for the ATM.

In an exemplary embodiment, if an ATM hard drive and/or the data on an ATM hard drive is destroyed or otherwise corrupted, the described TPM configuration software and the ATM applications may be reinstalled on the ATM by a technician servicing the machine. The TPM configuration software may then be used to reinstall the TPM backup data corresponding to the ATM to return the ATM to a functional state. However, in the event the motherboard including the TPM is replaced in the ATM, the above described steps for acquiring ownership of the TPM, generating signature keys, acquiring corresponding certificates, and backing up the new TPM data may be carried out to return the ATM to a functional state.

In an exemplary embodiment of an ATM that includes an EPP, the EPP may be used to securely receive data (in addition to keys) used in the operation of the ATM. For example, data such as ATM screen data usable to generate user interfaces through a display device of the ATM, may be provided to the ATM from a host banking system. Examples of ATMs which use screen data are shown in U.S. application Ser. No. 11/169, 315 filed on Jun. 28, 2005, which is hereby incorporated herein by reference. To prevent such screen data from being accessed and/or modified by an unauthorized application or device, the screen data may be encrypted at the host into a form which is capable of being decrypted by an EPP in the ATM. For example, the screen data may be encrypted by the host using a secret key such as a communication key known to the EPP. The computer of the ATM may include software operative to transfer the encrypted screen data received from the host to the EPP and to cause the EPP to decrypt the screen data. The EPP and/or the software in the computer of the ATM may also be operative to cause the screen data to be encrypted again using the TPM. The screen data encrypted using the TPM may then be stored in a data store until needed to generate a user interface screen. When at least a portion of the screen data is needed to generate a user interface screen, the TPM may be used to decrypt at least the portion of the screen data. The decrypted screen data may then be used by the computer and/or a processor in the display device to produce an output through the display device of the ATM, associated with a transaction function being performed by the ATM (e.g. dispensing cash).

For example in one embodiment, the display device may include a processor that is programmed to received encrypted screen data and communicate with the TPM to cause the encrypted screen data to be decrypted prior to the processor of the display device using the screen data to generate a visual output. In a further embodiment, software in the computer of the ATM may use the TPM to decrypt the screen data. The decrypted screen data may then be used by the software to generate instructions through the operating system which cause a video graphics controller of the ATM to generate an output through a display device of the ATM. In this alternative embodiment, the video graphics controller may correspond to the previously described protected video graphics controller. As a result, the communications between the operating system and the protected video graphics controller may be encrypted through use of the TPM to prevent unauthorized access to and/or altering of the intended video signal produced by the video graphics controller.

In embodiments in which screen data is encrypted, or in embodiments in which the screen data is not encrypted, the ATM may require screen data to be digitally signed and the digital signatures authenticated prior to outputting a user interface responsive to such screen data. Such screen data or other data may be signed with private key of the host. Such a private key may be associated with a public key incorporated in a digital certificate of the host. The host digital certificate may be stored in the EPP or stored in a certificate data store on the computer of the ATM. In one embodiment, the processor of the EPP may use the host public key to authenticate signed data such as screen data received from the host. In other embodiments, the TPM may use the host public key to authenticate signed data received from a host.

As used herein, screen data corresponds to any instructions which are usable by the ATM to produce user interface outputs through an output device of the ATM. Such output devices typically include a display device. However, such output devices may also include sound output devices such as a sound system of the ATM. The sound output device may include speakers and/or a headphone jack. Thus screen data may include instructions for generating both visual and audible outputs. For example, screen data may include instructions for generating the text and graphics which comprises a visual screen. Such instructions may include HTML and XML. In addition screen data may include graphics files corresponding to icons, images, bitmaps, gifs, and jpgs. Further screen data may include sound files such as wav, or mp3 files. Screen data may also include text which is flagged for being processed by speech synthesizer hardware and/or software for use with generating verbal audible outputs.

In addition to using the EPP to decrypt screen data received from a host banking system, in embodiments of the ATM the EPP may be used to decrypt other types of data sent from a host. Such other types of data (besides keys and screen data) may include markup language documents or other types of document used to configure and control the operation of the ATM. Examples, of ATMs which use markup language documents received from a host to configure and operate an ATM are shown in U.S. application Ser. No. 10/990,334 filed Nov. 16, 2004 which is hereby incorporated herein by reference. As with the screen data, the other types of information decrypted using the EPP may be encrypted again using features of the TPM and stored on the ATM for later use in operating the machine and devices in the ATM.

Although the previously described systems and method have been directed to an ATM that includes a TPM used to establish a TP, it is to be understood that in alternative embodiments, the previously described systems and methods of using a TPM may be provided in other types of self service terminals in addition to ATMs. Examples of other types of self service terminals which may include embodiments of the previously described TP may include kiosks, self check-out systems, and electronic voting machines.

Figure 11:
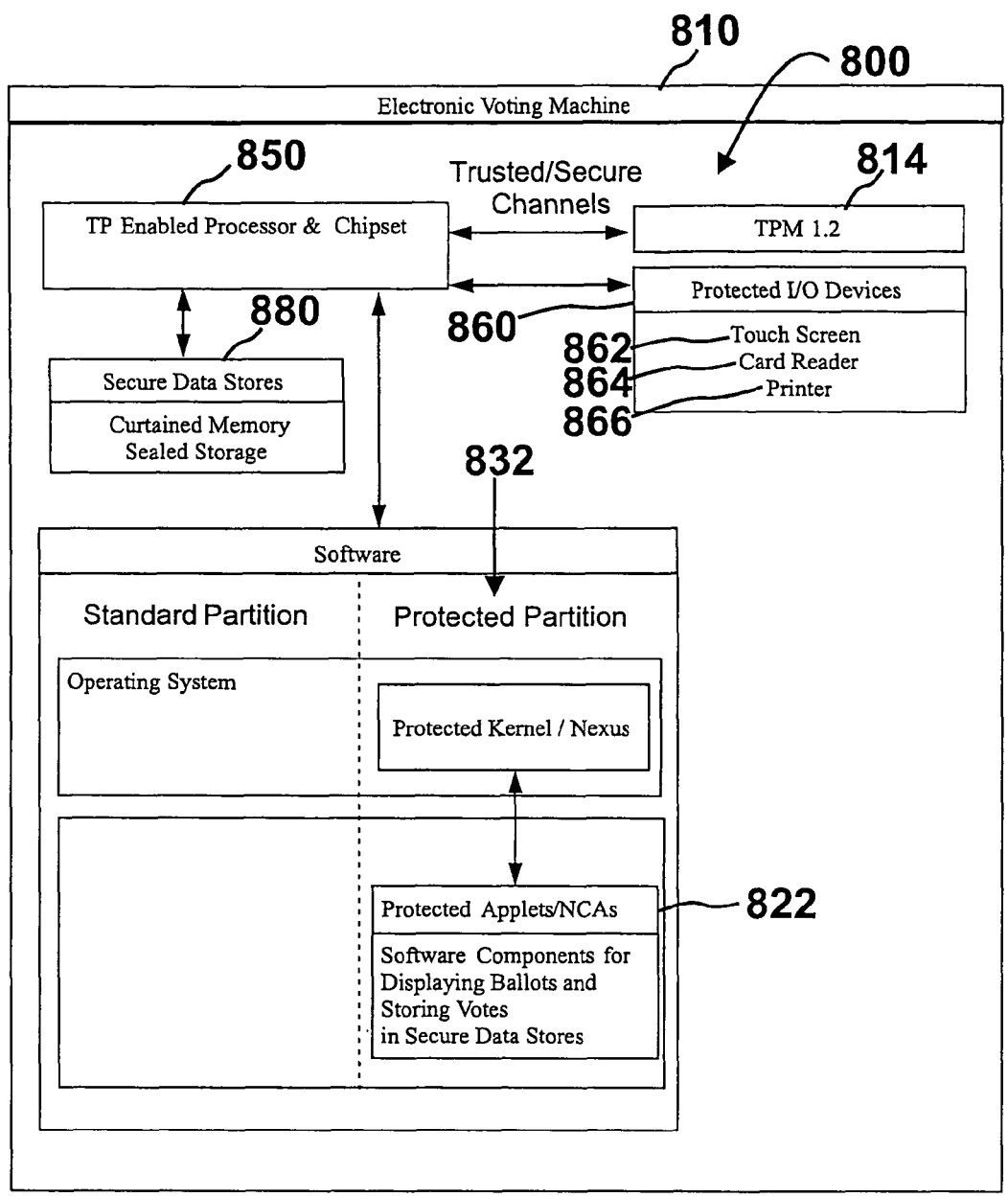
FIG. 11 shows a schematic view of an electronic voting machine which includes a trusted platform with a trusted platform module.

FIG. 11 shows an embodiment of a voting machine 810 which comprises a TP 800 with a TPM 814 in operative connection with a computer processor 850 of the voting machine. The voting machine may include protected input and/or output devices 860 adapted for use with the TP to establish trusted and secure communication channels between the processor and the input and/or output devices of the machine. For example, the voting machine may include a touch screen 862 that functions as both an input device and output device. The TP may be operate to establish a trusted and secure channel for receiving encrypted touch screen inputs from the touch screen. In addition, the voting machine may include a protected video graphics controller which is adapted for use with the TP to establish a trusted and secure channel for receiving data from the processor for outputting a user interface through the touch screen. The embodiment of the video graphics controller may include video memory, for example, in which at least a portion of the video data stored therein is encrypted and secure from modification by an unauthorized component such as a virus or worm.

In this described embodiment, the voting machine may include protected applets or NCAs, referred to herein as voting software components 822 which are operative in the protected partition 832 of the TP. The voting software components may be operative to cause the touch screen to output a user interface with information representative of a voting ballot. The voting machine may also include a card reader 864 or other input device which is operative to read ballot information from a portable memory device. Such a portable memory device, for example, may correspond to a smart card, flash memory card, or any other portable device which includes a data store for storing ballot information. The ballot information may include the precinct, political party or other information for which the user with the card is authorized to cast votes.

The embodiment of the voting machine may include one or more secure data stores 880 which include at least one of curtained memory areas and/or sealed storage managed by the associated protected memory management features of the computer processor, associated chipsets, TPM, and/or protected kernel of the voting machine TP.

In at least one of the secure data stores, the voting machine is operative to store election information representative of the candidates and issues capable of being voted on for one or more precincts, political parties or other groupings of election data. In an embodiment of the voting machine, the voting software components 822 of the voting machine are responsive to the election information accessed from a sealed storage of the machine and ballot information accessed from a portable memory device by the machine to cause the computer of the machine to generate a user interface through the touch screen which shows each of the candidates and issues the user is authorized to cast votes.

In an embodiment of the voting machine, the card reader or other input device for reading ballot information may correspond to a protected input/output device which is adapted for use with a TP to establish a trusted and secure communication channel with the processor of the machine. In an embodiment of the voting machine, the ballot information stored on the portable memory device may be digitally signed and/or encrypted. An embodiment of the voting software components may be operative to verify the digital signature associated with the ballot information and/or decrypt the ballot information prior to forming a user interface usable to cast votes.

In an embodiment of the voting machine, the voting software components may be operative to receive the inputs from the touch screen corresponding to votes cast by users of the machine for and against candidates and issues displayed by the touch screen. The inputs received by the voting software components may also correspond to other information associated with the voting process such as write in candidates. As used herein, such inputs are referred to as voter inputted information. In the embodiment of the voting machine, the voting software components may be operative to securely store the voter inputted information associated with a plurality of user's of the machine into one or more secure data stores.

Embodiments of the voting machine may further include a printer 866. The voting software components may be operative to cause the printer to output a printed ballot with indicia representative of the ballot information and/or voter inputted information. In an embodiment of the voting machine, the printer may be adapted for use with a TP to establish a trusted and secure communication channel between the printer and the computer processor.

In further embodiments, the printer may be operative to direct printed ballots into a ballot box or other storage chamber. Prior to depositing a printed ballot into a storage chamber, the printer may be operative to place the printed ballot into a location which is viewable by the user that provided the voter inputted information. The voting software components may further be operative to prompt the user to confirm that the printed ballot is accepted. In response to receiving an input representative of the ballot being accepted, the voting software components may be operative to cause the printer to move the ballot into the storage chamber In response to receiving an input representative of the ballot not being accepted, the voting software components may be operative to cause the printer to mark the ballot with indicia representative of the ballot being designated as not accepted by the user. The printer may then be operative to move the marked ballot into the storage chamber In an embodiment of the voting machine, the voting software components may be operative to enable the user through use of the touch screen to modify the previously provided voter inputted information and print a new ballot with the printer. In an embodiment of the voting machine, the voting software components may be operative to store voter inputted information in more than one secure data stores managed by the TP. In an embodiment of the voting machine, a first secure data store may correspond to the curtained memory of the voting software component. The curtained memory may include voter inputted information for a current ballot being viewed by a user. When the user wishes to modify the voter inputted information, the voting software components may be operative to cause the touch screen to redisplay one or more user interface screens representative of the previously provided voter inputted information accessed form the curtained memory associated with the voting software component.

When the user provides an input to the machine indicating that the ballot is accepted by the user, the voting software components of the machine may be operative to store the voter inputted information in at least one second secure data store. The at least one second secure data store may be operative to hold voter inputted information from a plurality of different users. In an embodiment of the voting machine, the at least one second secure data store may correspond to sealed storage stored on a nonvolatile data store such as a hard drive or flash memory card. In a further embodiment, the voting software components may be operative to store the accepted voter-input information in two or more secure data stores physically located on different data store devices. The two different memory devices for example may correspond to a sealed storage on a hard drive and an encrypted file stored on a portable storage device such as a flash memory card. The voting software components may also be operative to digitally sign the voter inputted information that is stored in the encrypted file.

In an embodiment of the voting machine, when an election is completed, the portable storage device cards with the encrypted voter inputted information may be removed from the machine and transported to a further machine capable of accumulating votes for an election from a plurality of different voting machines. In an embodiment of the voting machine, the further machine may correspond to another voting machine which includes a voting software component with one or more cryptographic keys which are capable of decrypting and authenticating the voter inputted information from a plurality of different portable storage devices.

In further embodiments of an ATM or other self service terminal a TPM may be used to perform cryptographic calculations associated with enabling a user of the terminal to digitally sign electronic documents (e.g. loan papers, contracts, deeds, mortgages) visually displayed through a display device of the ATM. Examples of ATMs and other kinds of terminals capable of being used to digitally sign electronic documents are shown in U.S. patent application Ser. No. 09/683,942 filed Mar. 5, 2002, which is hereby incorporated herein by reference. Examples of cryptographic functions performed using a TPM to digitally sign electronic documents for users may include one-way hash functions such as SHA-1 or MD5.

In an embodiment of the described terminal, the software operating in the terminal may access the TPM to generate a hash or digest of an electronic document displayed to a user through a display device of the terminal. This hash may be encrypted by a remote server, or other processor in communication with the terminal, to form a digital signature which is attached to or otherwise associated with the electronic document. In this described embodiment, the private key used to encrypt the hash of the electronic document may be securely stored by the remote server in association with a financial account number (e.g. credit/debit account number), driver's license number, and/or national ID card number associated with the user. Such a private key may be accessed for use with encrypting the hash of the electronic document responsive to the terminal reading the account number associated with the user from a card of the user and responsive to the user providing in input of a password such as a PIN into an input device of the terminal.

In the embodiments described above, reference has been made to the generation or use of numbers such as random numbers, passwords, PINS, and hashes. Such numbers may correspond to a series of characters comprised of only numeric digits (e.g. 0-9). However it is to be understood that depending on the procedure for generating, inputting, and or otherwise using the described numbers in the particular embodiment, such numbers may also include: alphanumeric characters (e.g. a-z, A-Z and 0-9), characters from different alphabets and languages, characters corresponding to symbols and/or non-printable characters. As used herein, the reference to numbers may in one or more embodiments encompass at least one character capable of being recognized or manipulated by a computer processor.

Also as used herein, reference is made to hashing data to form a hash or digest. Such hashes or digests correspond to the output of a one way hash function (e.g. MD5 and SHA-1) operating on the data. Also as used herein, reference is made to various symmetric (e.g. DES, AES) and asymmetric (RSA) encryption and decryption algorithms and keys. However, is to be understood that the cryptographic software and hardware employed by embodiments described herein may use other one-way has functions and encryption/decryption algorithms depending on the desired level of cryptographic security, and the processing capabilities of the hardware employed for the embodiment.

Computer software instructions used in operating the automated banking machines and connected computers may be loaded from computer readable media or articles of various types into the respective computers. Such computer software may be included on and loaded from one or more articles such as diskettes, CDs, DVDs, flash memory devices. Such software may also be included on articles such as hard disk drives, tapes or ready only memory devices. Other articles which include data representative of the instructions for operating computers and processors of devices in the manner described herein are suitable for use in achieving operation of automated banking machines and systems in accordance with embodiments described here.

Thus the new automated banking machines and other self-service terminals described herein achieve one or more of the above stated objectives, eliminates difficulties encountered in the use of prior devices and systems, solves problems and attains the desirable results described herein.

In the foregoing description certain terms have been used for brevity, clarity and understanding; however, no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
   an automated banking machine that operates responsive to data read from data bearing records to cause financial transactions, including:
      a plurality of devices including:
         a card reader operative to read card data on user cards corresponding to financial accounts;
         a cash dispenser;
         at least one display device;
         an encrypting pin pad (EPP), wherein the EPP includes at least one processor and a keypad, wherein the processor is operative to encrypt a personal identification number received through operation of the keypad;
      at least one computer in operative connection with the plurality of devices;
      a housing, wherein the at least one computer and the plurality of devices are in operatively supported connection with the housing;
      wherein the at least one computer is operatively configured to receive encrypted screen data from a host banking system, wherein the at least one computer is operatively configured to cause the at least one processor of the EPP to decrypt the screen data, wherein the at least one computer is operatively configured to cause the at least one display device to produce a visual output corresponding at least in part to at least a portion of the decrypted screen data.

2. The apparatus according to claim 1, wherein the at least one computer includes a data store and a trusted platform module (TPM) in operative connection with the at least one computer in the housing, wherein after the screen data is decrypted by the at least one processor of the EPP, the at least one computer is operatively configured to use the TPM to encrypt the screen data and store the encrypted screen data in the at least one data store, wherein the at least one computer is operatively configured to use the TPM to decrypt the portion of the screen data stored in the data store, wherein the at least one computer is operatively to cause the at least one display device to output a visual user interface responsive at least in part to the portion of the screen data decrypted through use of the TPM.

3. The apparatus according to claim 2, wherein the at least one display device includes at least one processor, wherein the at least one processor in the at least one display device is operative to generate the visual user interface responsive at least in part to the portion of the screen data decrypted through use of the TPM.

4. The apparatus according to claim 3, wherein the TPM is compliant with a Trusted Computing Group TPM 1.2 Specification.

5. The apparatus according to claim 4, wherein the at least one markup language document includes XML.

6. The apparatus according to claim 1, wherein the screen data includes at least one markup language document.

7. The apparatus according to claim 1, wherein the at least one markup language document includes HTML.

8. The apparatus according to claim 1, wherein the screen data includes at least one image file.

9. The apparatus according to claim 1, wherein the screen data includes at least one sound file.

10. The apparatus according to claim 1, wherein the automated banking machine includes at least one sound output device, wherein the at least one computer is operatively configured to cause the at least one sound output device to produce an audible sound corresponding to at least a portion of the screen data.

11. The apparatus according to claim 1, wherein the screen data received from the host banking system is digitally signed, wherein the at least one computer is operatively configured to cause the digitally signed screen data to be authenticated prior to use of the decrypted screen data by the at least one computer to cause the at least one display device to produce the output corresponding at least in part to the portion of the decrypted screen data.

12. The apparatus according to claim 1, further comprising the host banking system, wherein the host banking system is operatively configured to send encrypted screen data to a plurality of automated banking machines.

13. The apparatus according to claim 1, wherein the EPP includes a data store that includes a communication key stored therein, wherein the EPP is operative to use the communication key to both encrypt the PIN and to decrypt the encrypted screen data.

14. Apparatus comprising:
    an automated banking machine that operates responsive at least in part to data read from data bearing records to cause financial transactions, wherein the automated banking machine includes a plurality of devices including:
       a card reader operative to read card data on user cards corresponding to financial accounts,
       at least one display, and
       an encrypting pin pad (EPP), wherein the EPP includes at least one processor and a keypad, wherein the processor is operative to encrypt a personal identification number (PIN) received through operation of the keypad; and
    at least one computer operative to communicate with the plurality of devices, wherein the at least one computer is operatively configured to receive encrypted screen data from a host banking system, wherein the at least one computer is operatively configured to cause the at least one processor of the EPP to decrypt the screen data, wherein the at least one computer is operatively configured to cause the at least one display to produce a visual output that includes indicia corresponding at least in part to at least a portion of the decrypted screen data.

15. The apparatus according to claim 14, wherein the decrypted screen data includes at least one of at least one image file, at least one sound file, and at least one markup language document.

16. The apparatus according to claim 14, wherein the at least one computer is operatively configured to cause the at least one processor of the EPP to authenticate a digital signature associated with the screen data received from the host banking system.

17. The apparatus according to claim 14, wherein the EPP includes a data store that includes a communication key stored therein, wherein the EPP is operative to use the communication key to both encrypt the PIN and to decrypt the encrypted screen data.

* * * * *